United States Patent
Holland-Moritz et al.

(10) Patent No.: US 12,300,980 B2
(45) Date of Patent: May 13, 2025

(54) INSULATING-STRIPPING TOOL DESIGNED AS A HAND TOOL, CUTTING PART FOR AN INSULATION-STRIPPING TOOL AND METHOD FOR STRIPPING A CABLE

(71) Applicant: Rennsteig Werkzeuge GmbH, Steinbach-Hallenberg (DE)

(72) Inventors: Georg Holland-Moritz, Steinbach-Hallenberg (DE); Gerhard Koenig, Steinbach-Hallenberg (DE); Marko Endter, Steinbach-Hallenberg (DE)

(73) Assignee: Rennsteig Werkzeuge GmbH, Steinbach-Hallenberg (DE)

( * ) Notice: Subject to any disclaimer, the term of this patent is extended or adjusted under 35 U.S.C. 154(b) by 439 days.

(21) Appl. No.: 17/608,647

(22) PCT Filed: May 6, 2020

(86) PCT No.: PCT/EP2020/062619
§ 371 (c)(1),
(2) Date: Nov. 3, 2021

(87) PCT Pub. No.: WO2020/225325
PCT Pub. Date: Nov. 12, 2020

(65) Prior Publication Data
US 2022/0231491 A1 Jul. 21, 2022

(30) Foreign Application Priority Data
May 6, 2019 (DE) .......................... 102019111703.8

(51) Int. Cl.
*H02G 1/12* (2006.01)
*H02G 1/00* (2006.01)

(52) U.S. Cl.
CPC .......... *H02G 1/1231* (2013.01); *H02G 1/005* (2013.01); *H02G 1/1234* (2013.01)

(58) Field of Classification Search
CPC .. H02G 1/1219; H02G 1/1231; H02G 1/1229; H02G 1/1234; H02G 1/005
(Continued)

(56) References Cited

U.S. PATENT DOCUMENTS 1,273,713 A * 7/1918 Aaron .................. H02G 1/1224
30/90.6
2,141,002 A * 12/1938 Huff ..................... H02G 1/1231
30/91.2
(Continued)

FOREIGN PATENT DOCUMENTS

| CN | 105633863 A | 6/2016 |
| CN | 107342556 A | 11/2017 |

(Continued)

OTHER PUBLICATIONS

English language transalation of DE 44 11 028 obtained electronically from Clarivate Analytics via USPTO PE2E search (Year: 1995).*
(Continued)

*Primary Examiner* — Evan H MacFarlane
(74) *Attorney, Agent, or Firm* — Collard & Roe, P.C.

(57) ABSTRACT

An insulation-stripping tool designed as a hand tool for stripping insulation from a cable has a first insulation-stripping cutter for stripping the insulation transversely to a longitudinal direction of the cable and a second insulation-stripping cutter for stripping the insulation in the longitudinal direction of the cable.

14 Claims, 28 Drawing Sheets

(58) Field of Classification Search
USPC .................................. 30/90.6, 90.7, 353, 357
See application file for complete search history.

(56) References Cited

U.S. PATENT DOCUMENTS

| | | | | | |
|---|---|---|---|---|---|
| 3,151,510 | A * | 10/1964 | Bunker | ................ | H02G 1/1295 30/91.2 |
| 3,204,495 | A * | 9/1965 | Matthews | ............ | H02G 1/1226 30/90.1 |
| 3,483,617 | A * | 12/1969 | Krampe | ............... | H02G 1/1231 30/90.7 |
| 3,665,603 | A * | 5/1972 | Bilbrey | ................ | H02G 1/1231 30/90.7 |
| 3,914,864 | A * | 10/1975 | Prince | .................. | H02G 1/1234 30/91.2 |
| 4,117,749 | A * | 10/1978 | Economu | ............ | H02G 1/1229 30/90.6 |
| 4,472,877 | A * | 9/1984 | Undin | ................. | H02G 1/1231 81/9.42 |
| 4,489,490 | A * | 12/1984 | Michaels | ........... | H02G 1/1229 30/90.1 |
| 4,543,717 | A * | 10/1985 | Luka | .................... | H02G 1/1265 30/90.1 |
| 4,951,393 | A * | 8/1990 | Wallace | ............... | H02G 1/1229 81/9.4 |
| 5,077,895 | A * | 1/1992 | Okubo | ................ | H02G 1/1229 30/90.6 |
| 5,487,220 | A * | 1/1996 | Saitou | ................. | H02G 1/1231 30/90.6 |
| 6,067,715 | A * | 5/2000 | Hollingsworth | ..... | H02G 1/1236 81/9.44 |
| 6,463,654 | B1 * | 10/2002 | Moore | ................ | H02G 1/1231 81/9.51 |
| 6,662,450 | B1 * | 12/2003 | Ducret | ................ | H02G 1/1231 30/90.4 |
| 6,755,109 | B2 * | 6/2004 | Russell | ................ | H02G 1/1221 83/947 |
| 7,243,429 | B2 * | 7/2007 | Landes | ................ | H02G 1/1292 30/90.1 |
| 9,225,153 | B1 | 12/2015 | Anderson et al. | | |
| 10,763,651 | B2 * | 9/2020 | Green | ................. | H02G 1/1226 |
| 2003/0188432 | A1 * | 10/2003 | Temple | ................ | H02G 1/1229 30/90.6 |
| 2004/0055160 | A1 * | 3/2004 | Ducret | ................ | H02G 1/1231 30/90.1 |
| 2009/0013535 | A1 * | 1/2009 | Derancourt | ......... | H02G 1/1231 30/90.6 |
| 2013/0042483 | A1 * | 2/2013 | Ducret | ................ | H02G 1/1229 30/90.7 |
| 2020/0192029 | A1 * | 6/2020 | Zagula | .................. | G02B 6/245 |

FOREIGN PATENT DOCUMENTS

| | | | | |
|---|---|---|---|---|
| CN | 111049068 | A | 4/2020 | |
| DE | 3632685 | A1 | 3/1988 | |
| DE | 3808950 | A1 | 10/1989 | |
| DE | 4411028 | C1 | 9/1995 | |
| DE | 3904323 | A1 * | 8/1996 | ............... H02G 1/12 |

OTHER PUBLICATIONS

International Search Report mailed Jul. 29, 2020 issued in PCT/EP2020/062619 (with English Translation).

PCT—International Preliminary Report on Patentability of International Application No. PCT/EP2020/062619 Dated Dec. 17, 2021.

* cited by examiner

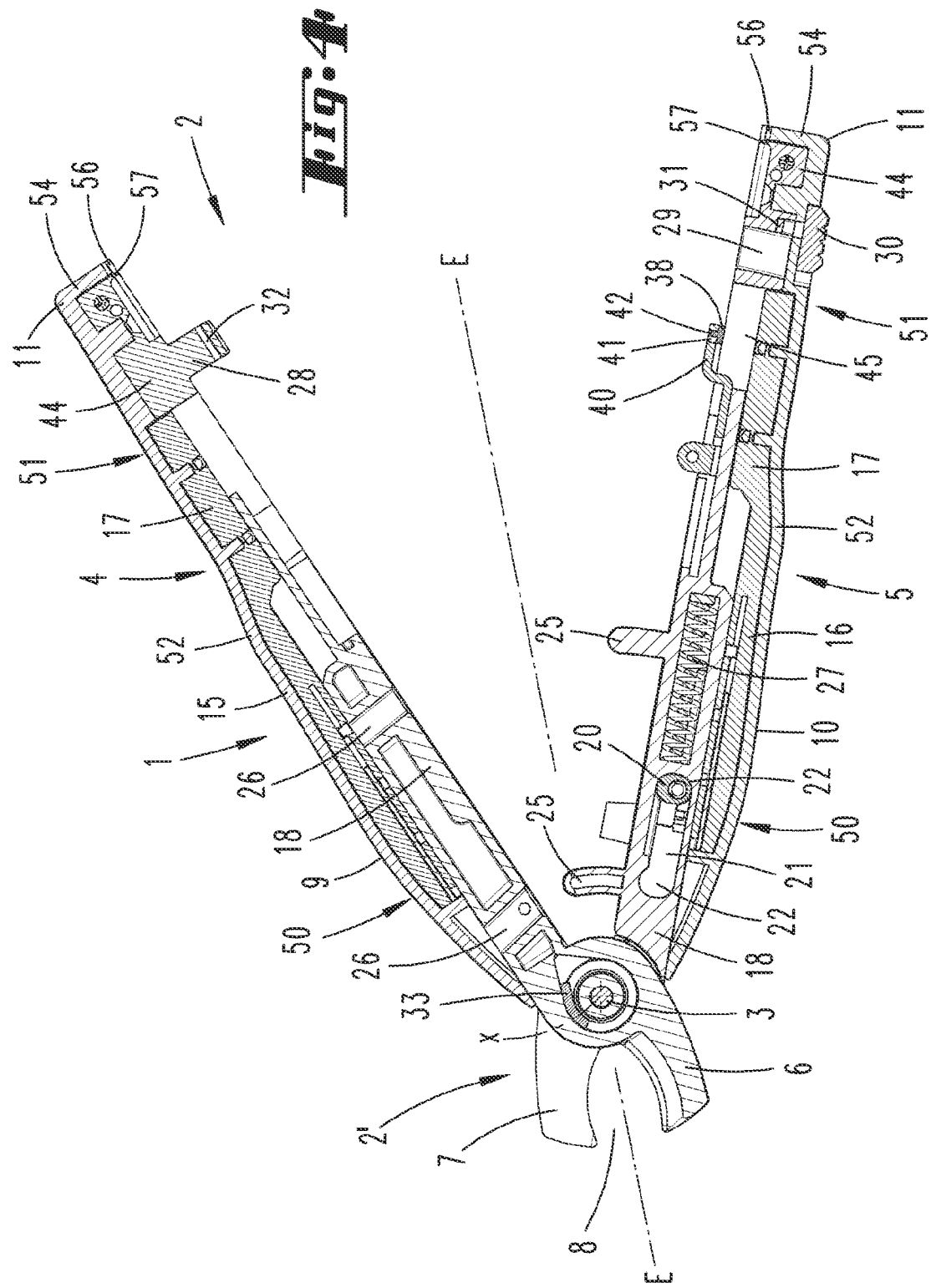

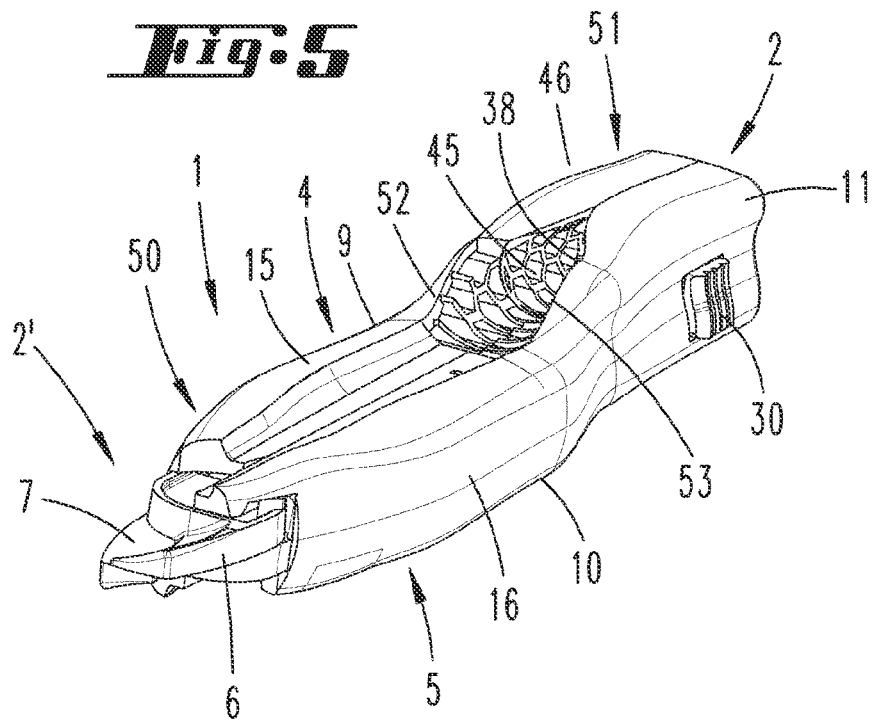
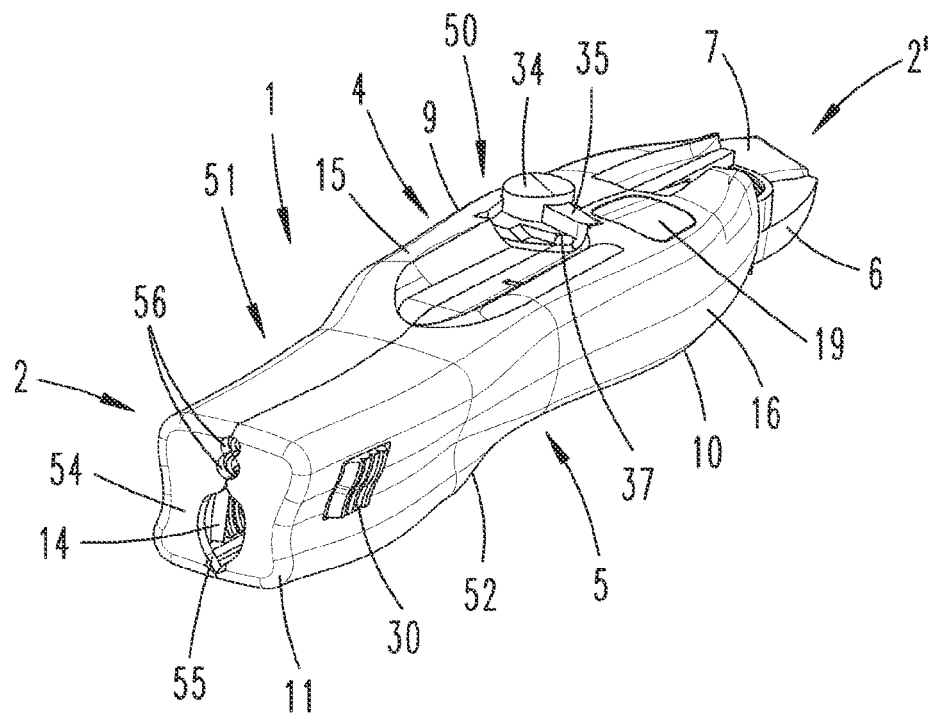

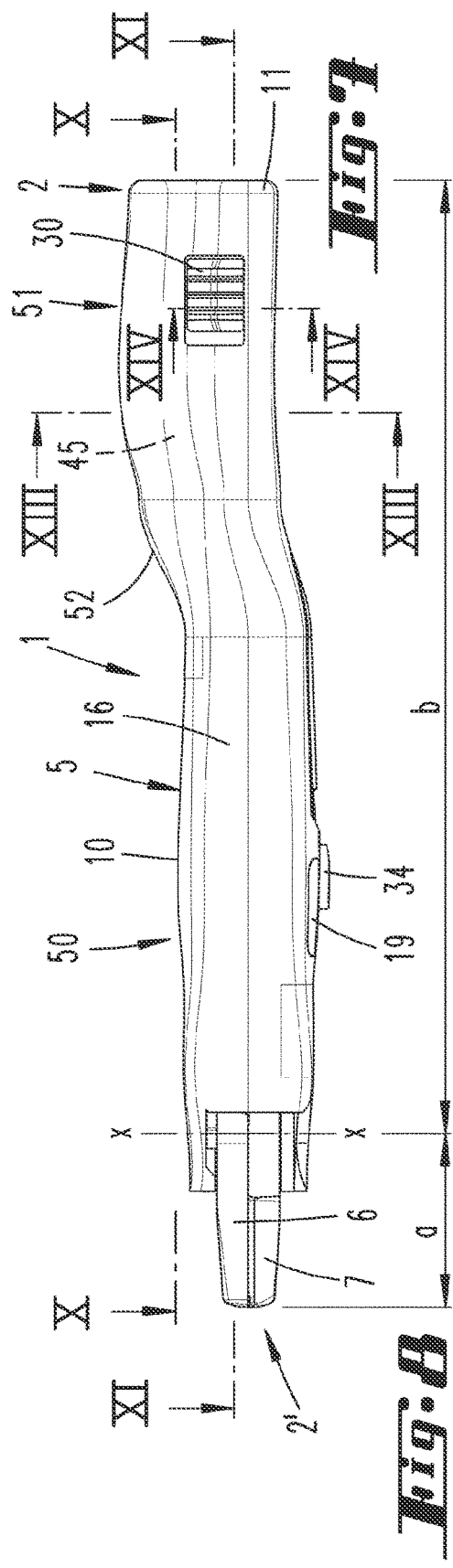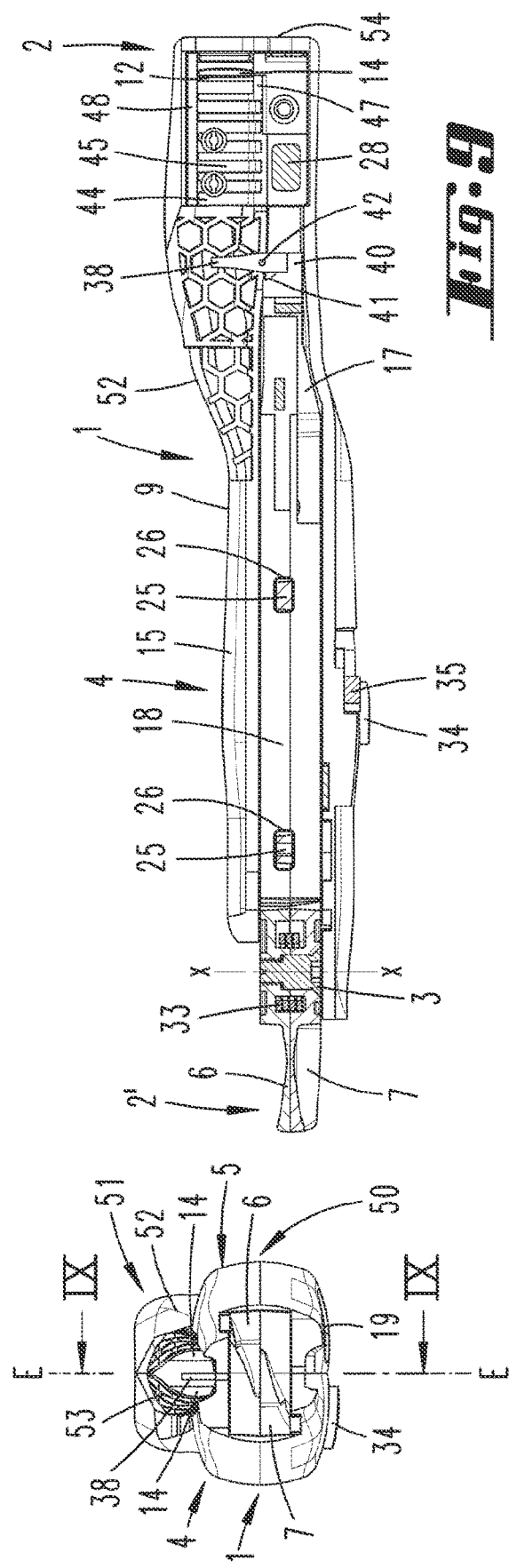

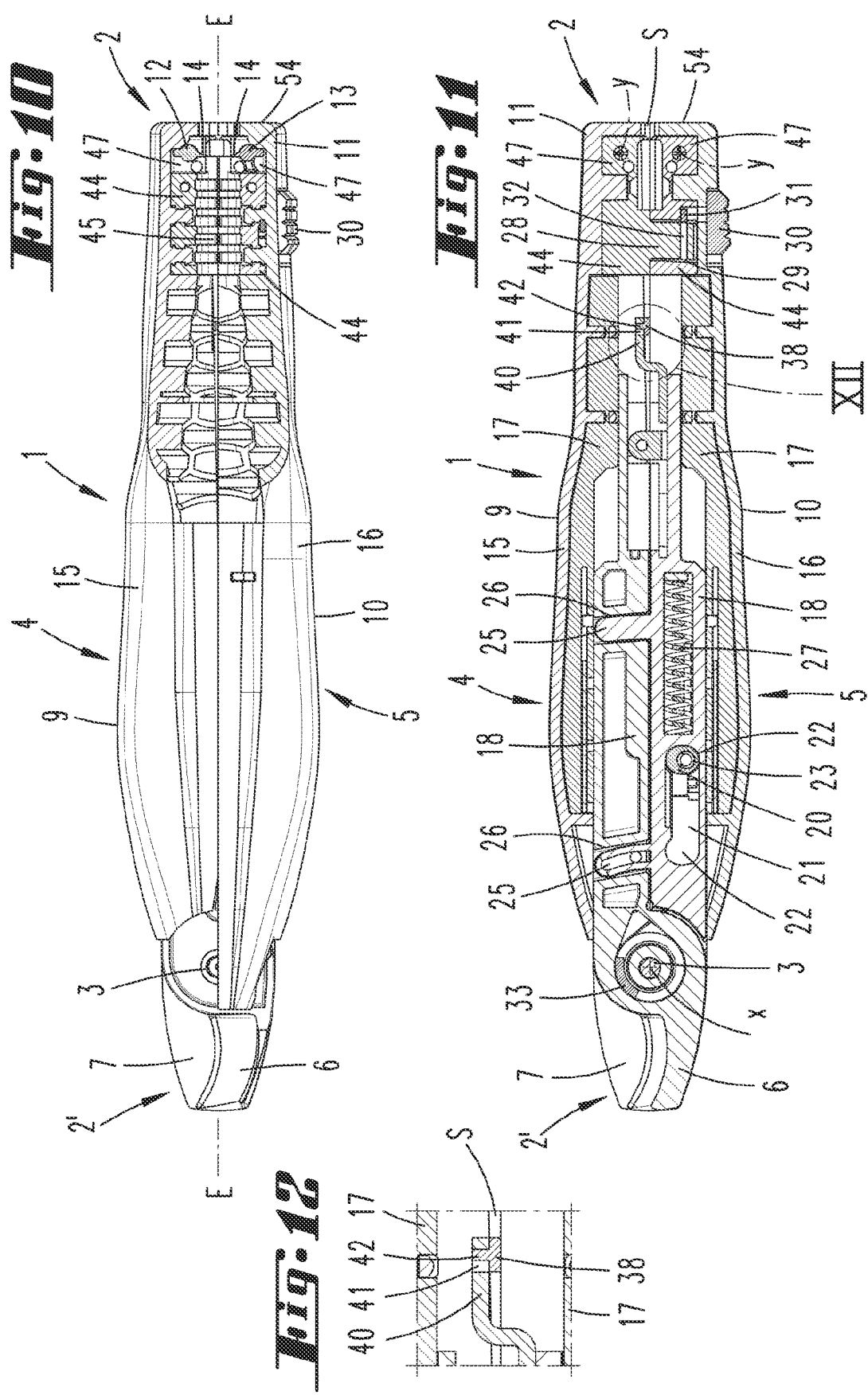

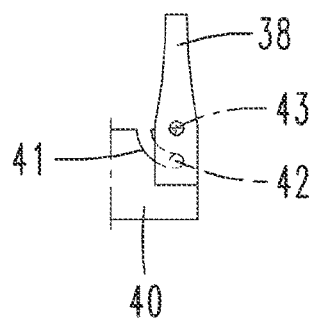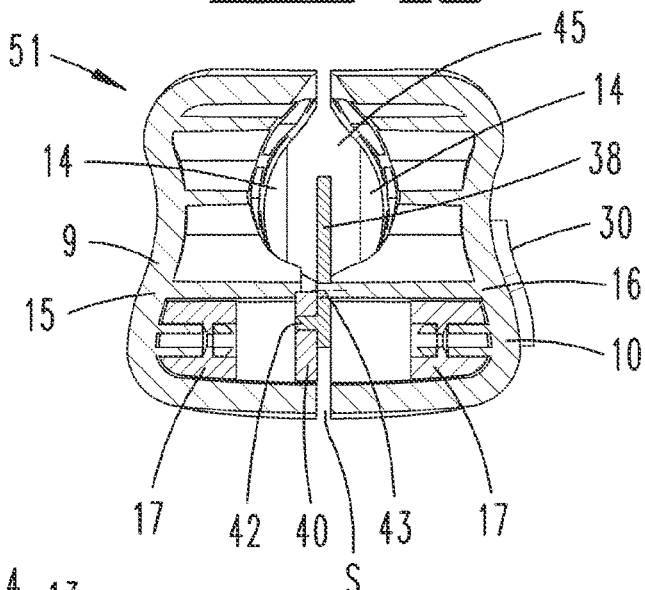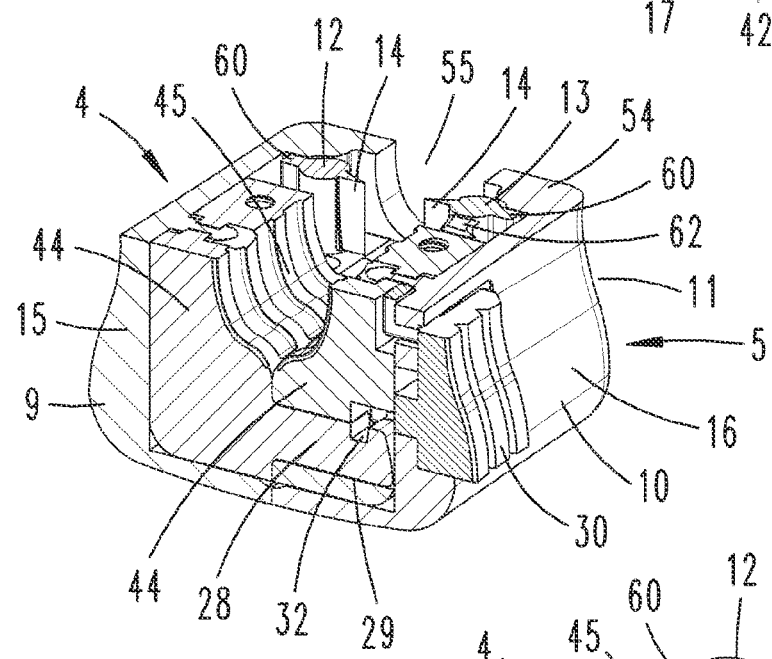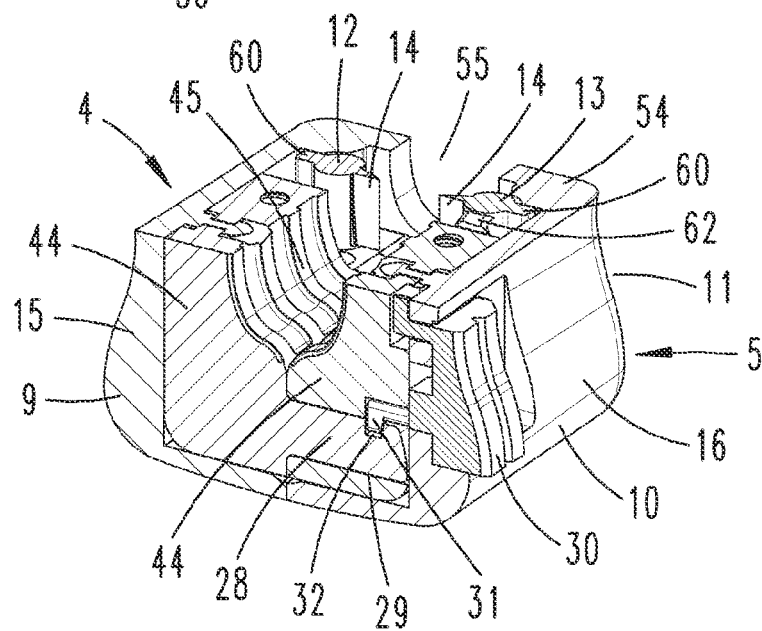

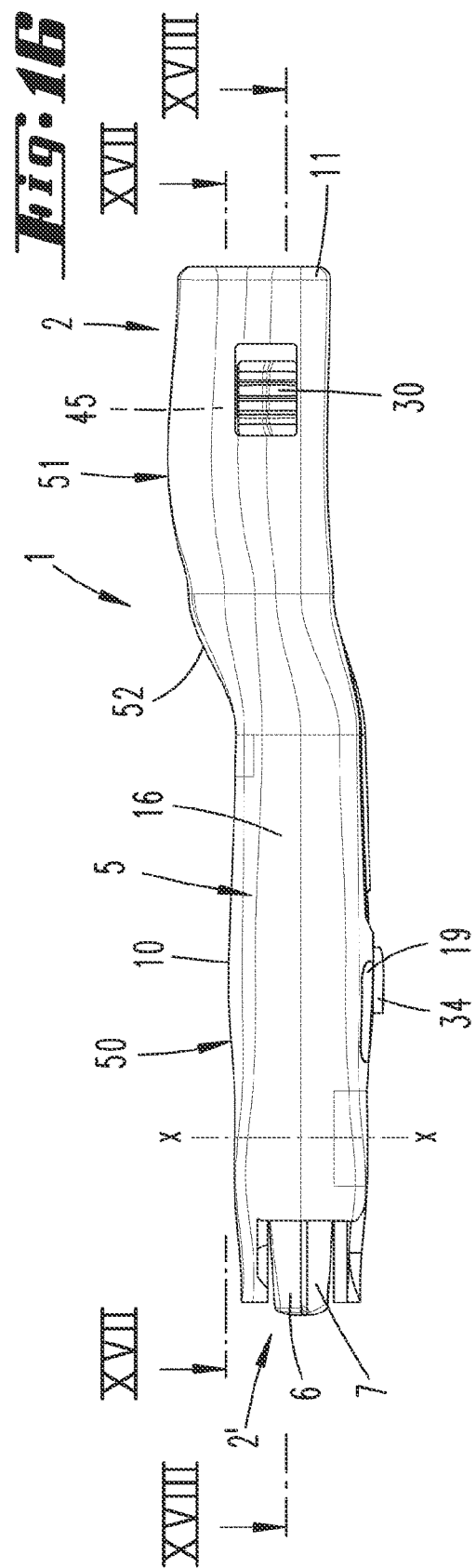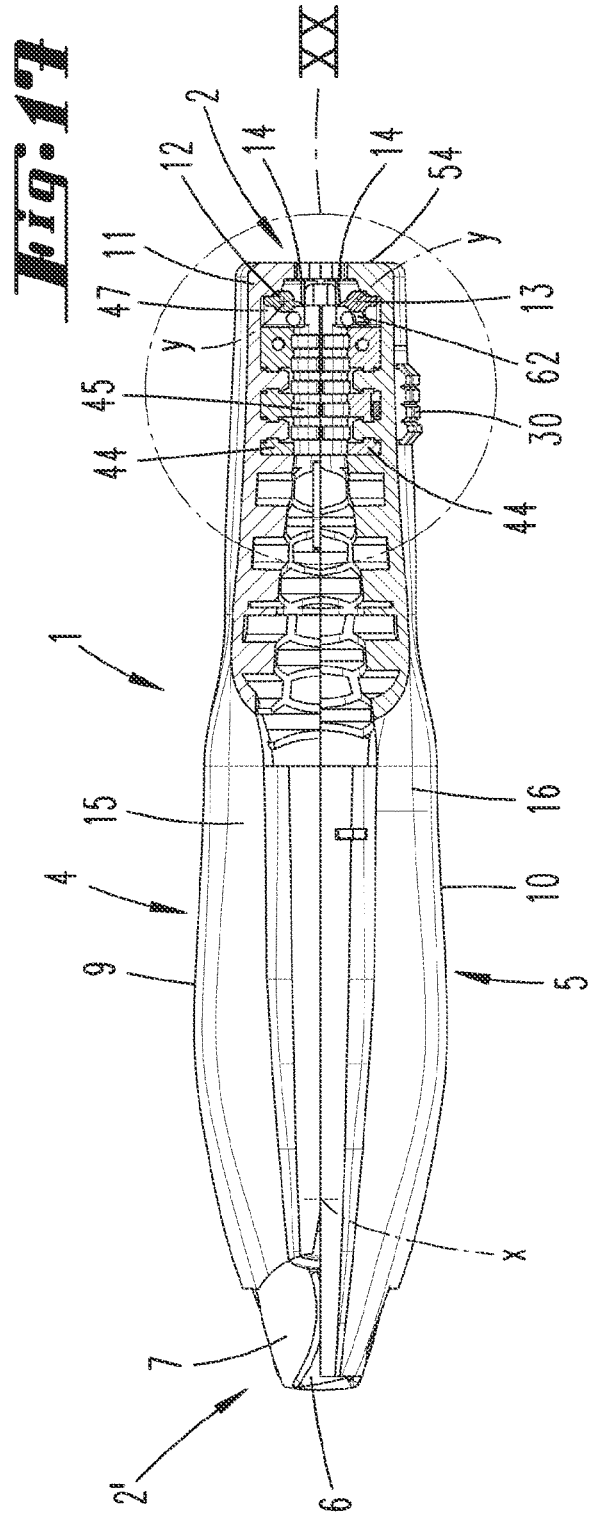

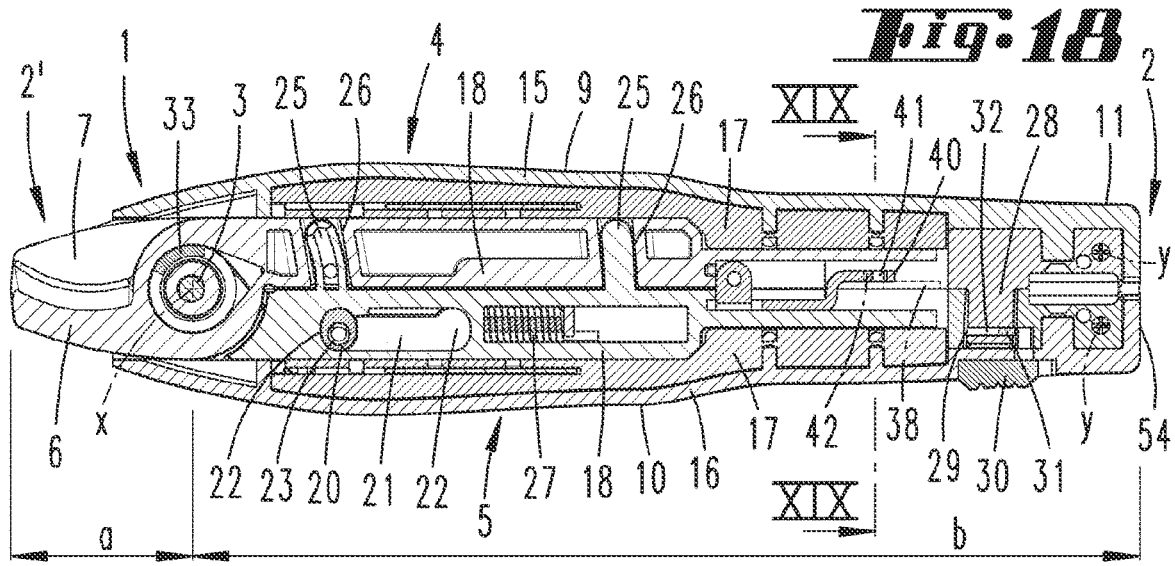
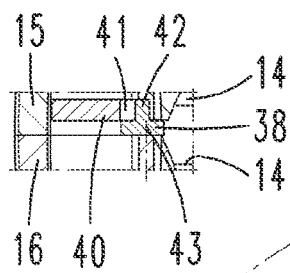
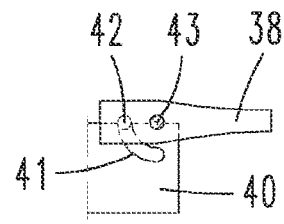
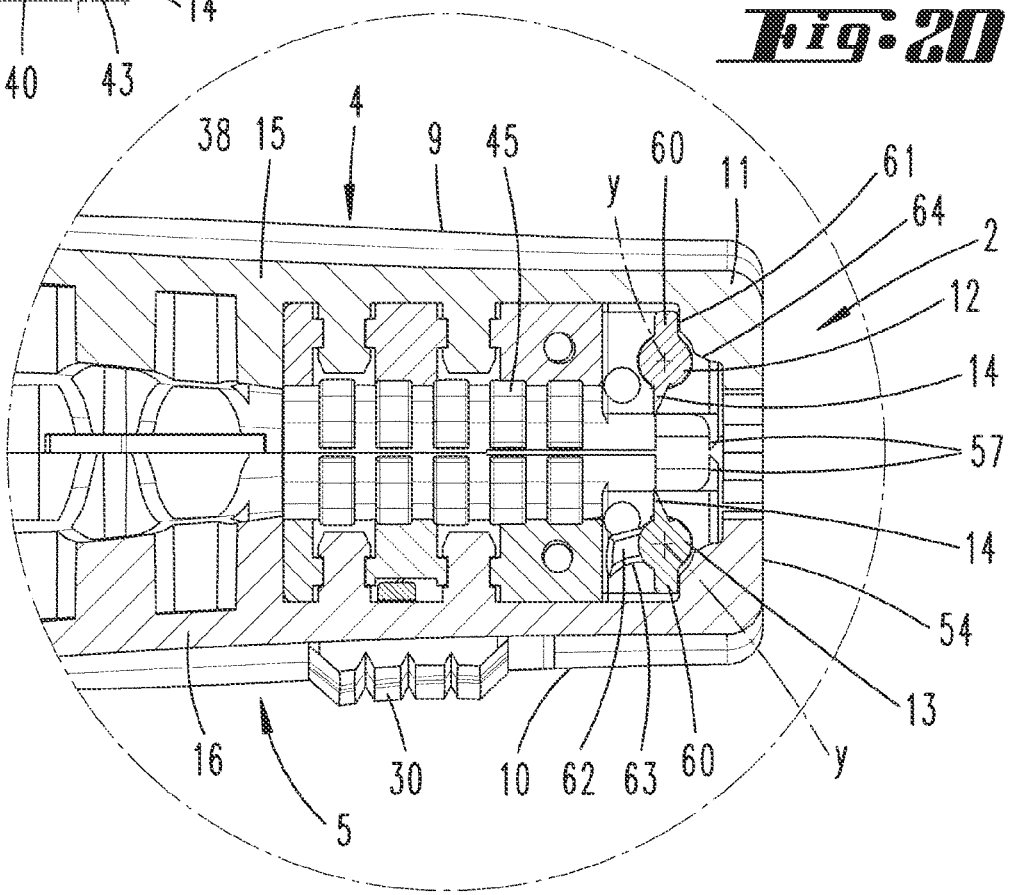

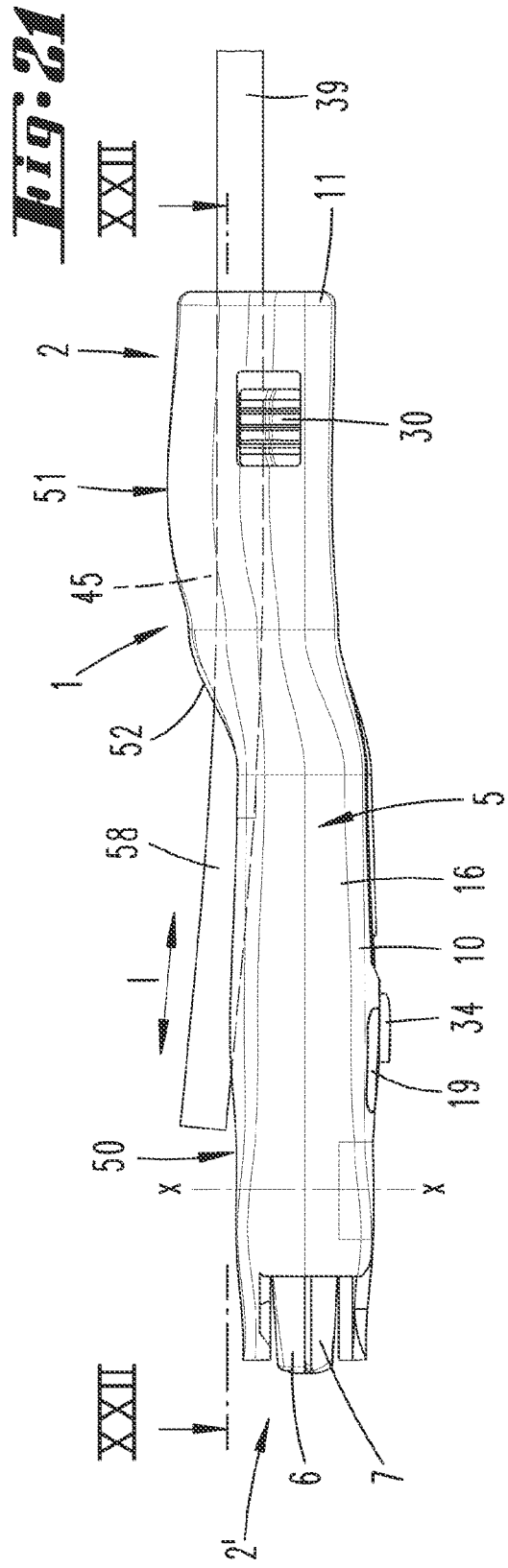
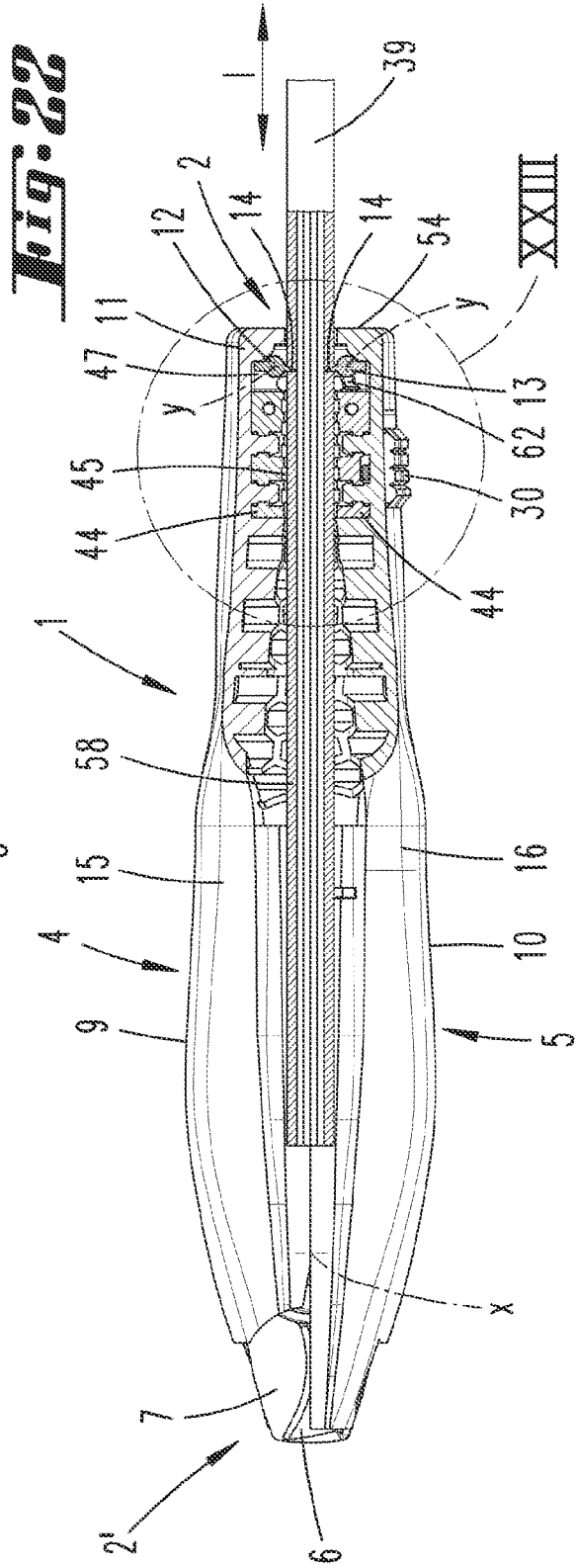

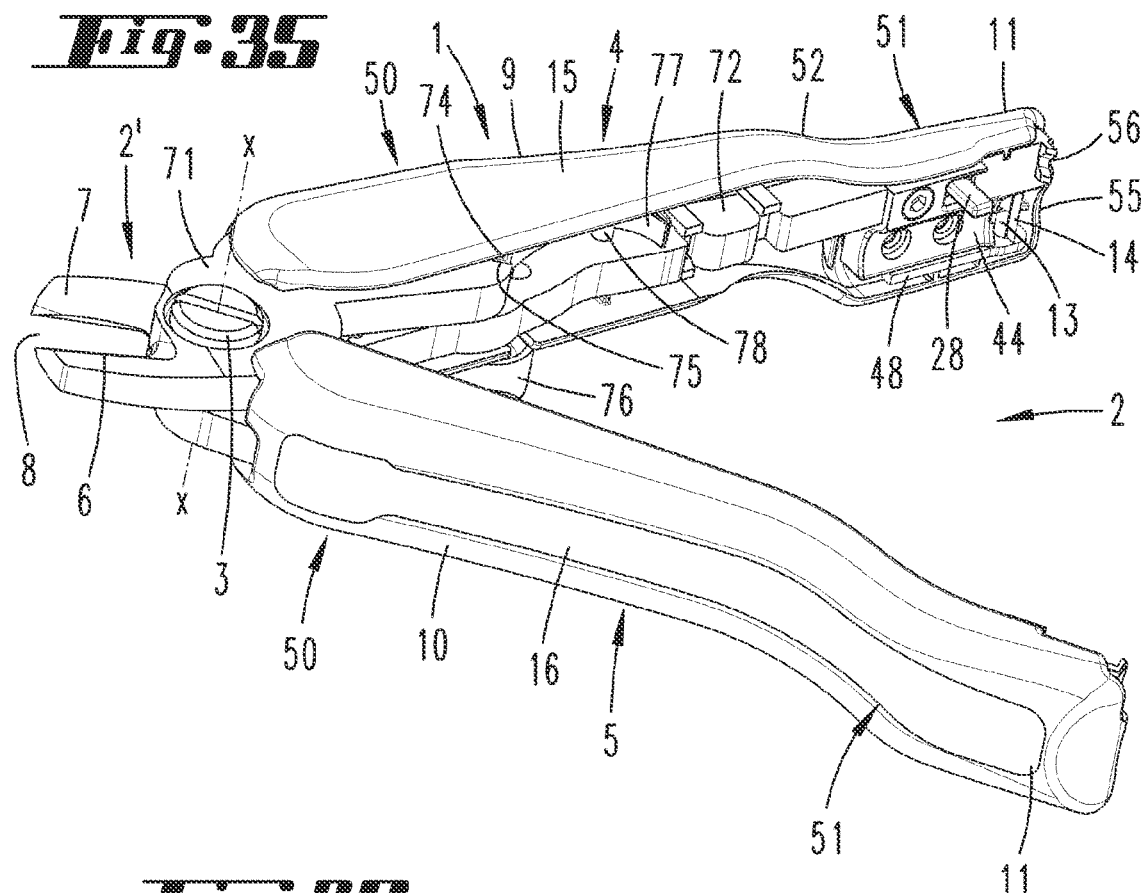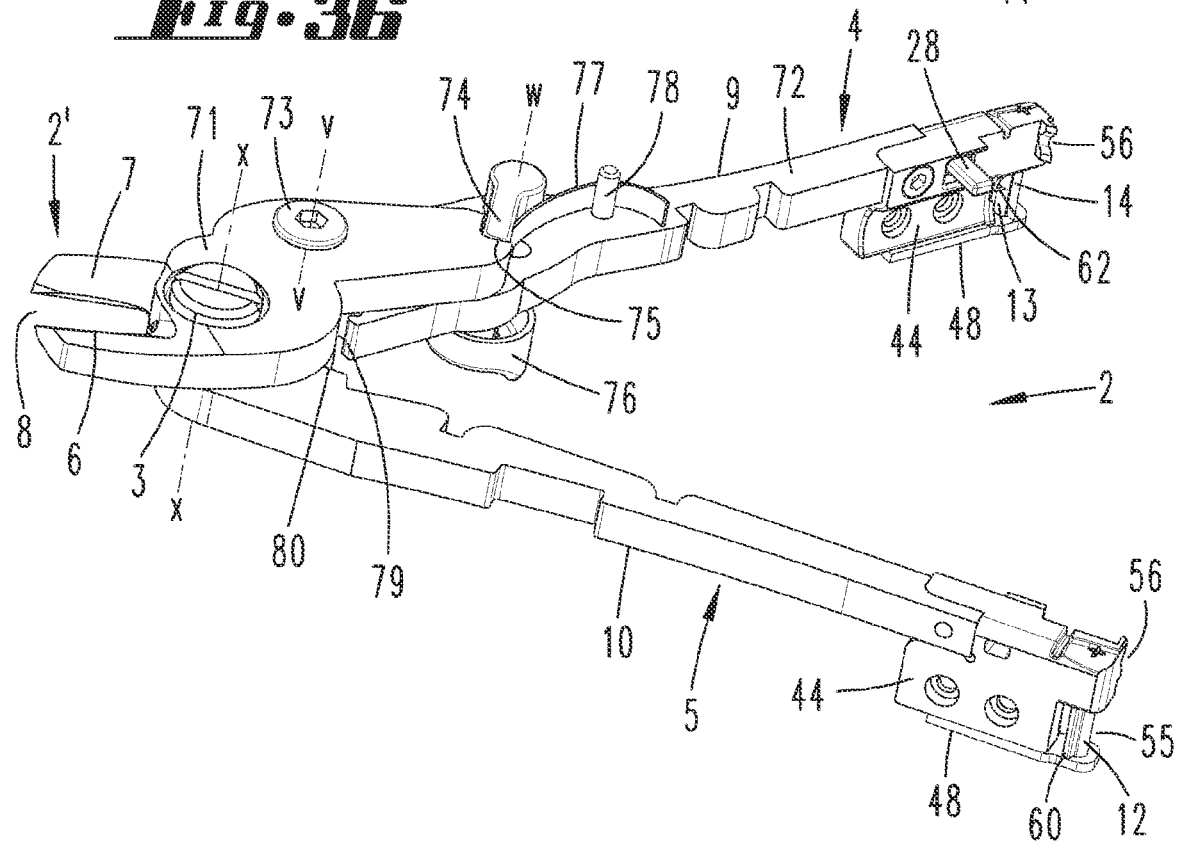

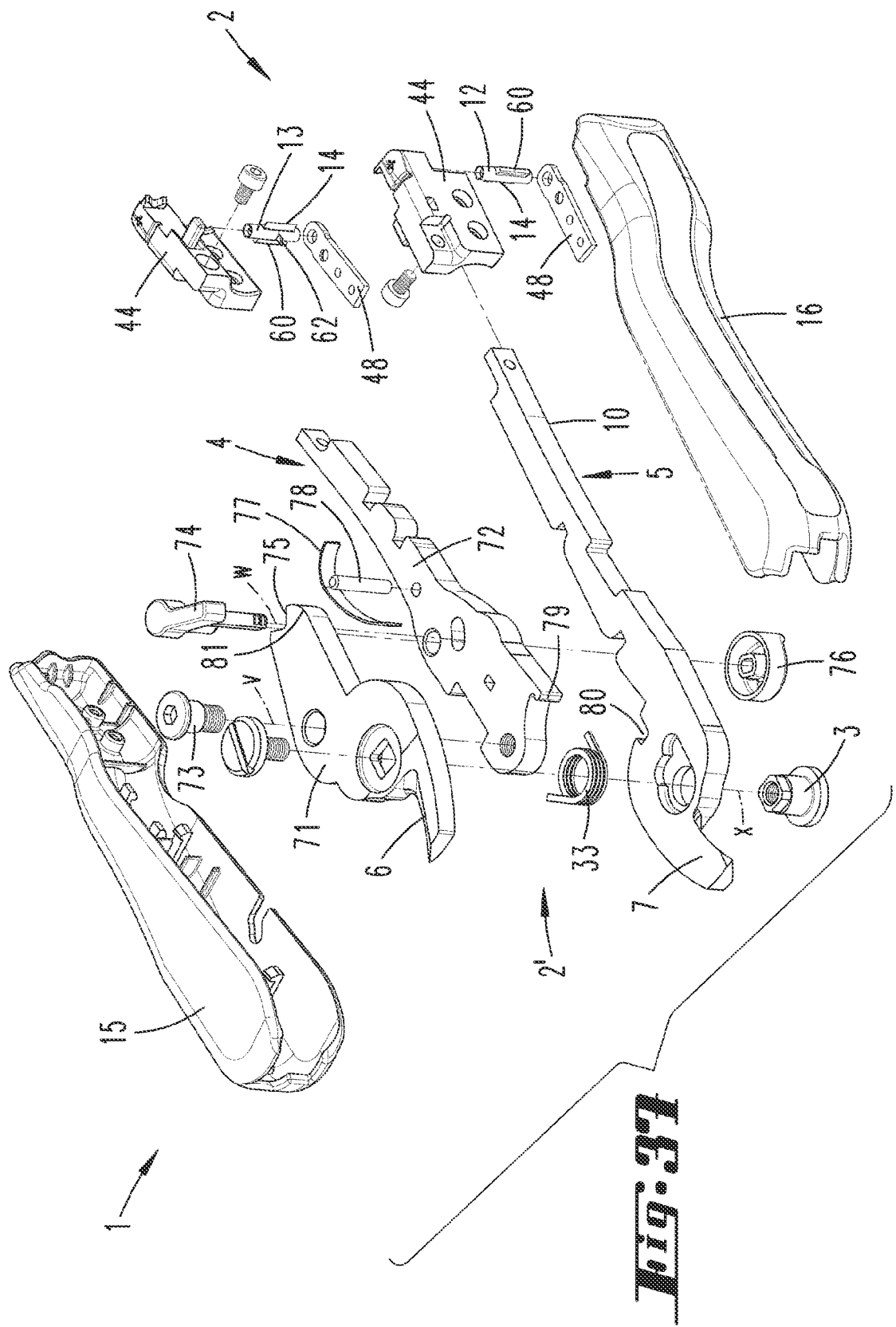

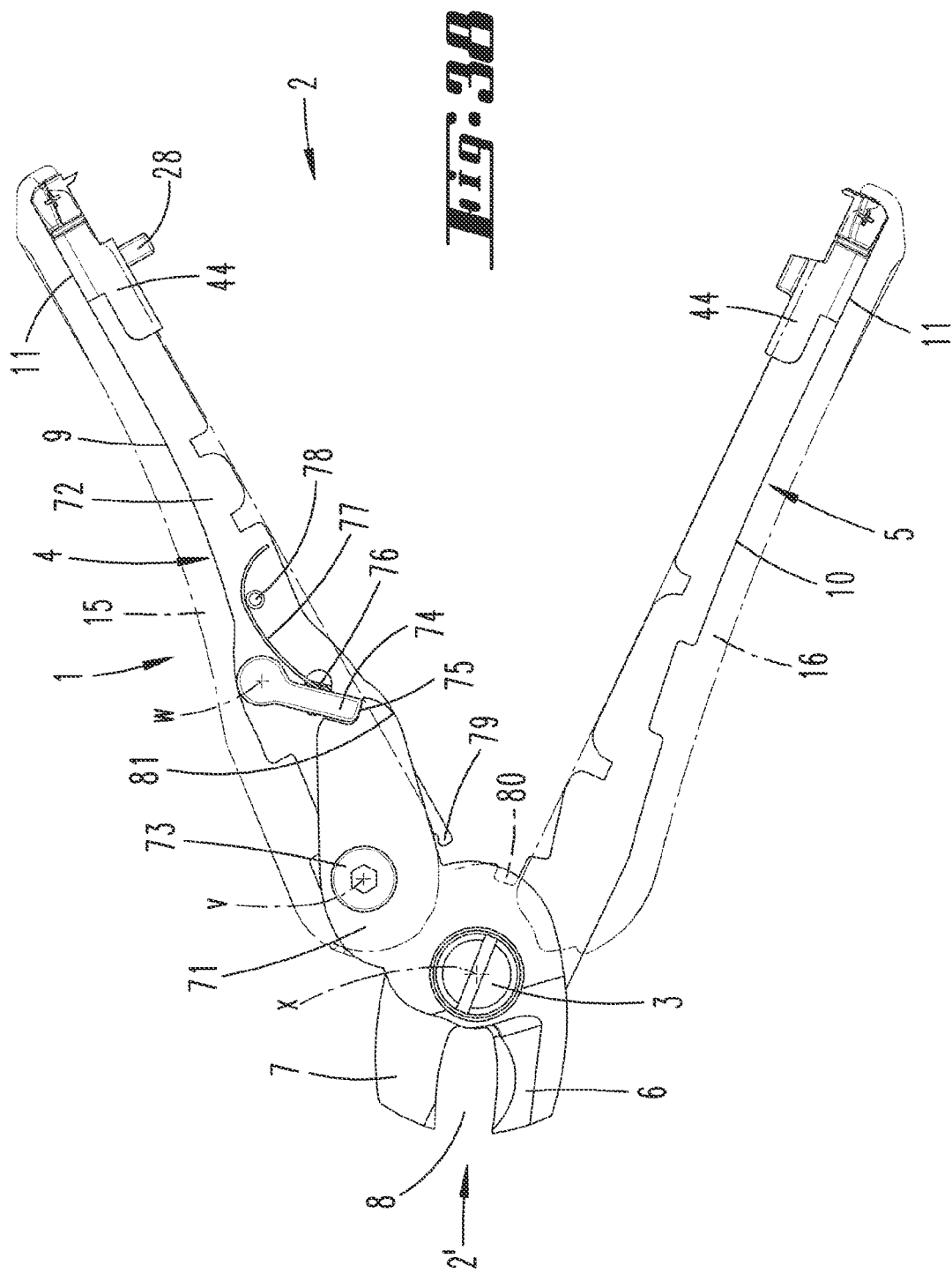

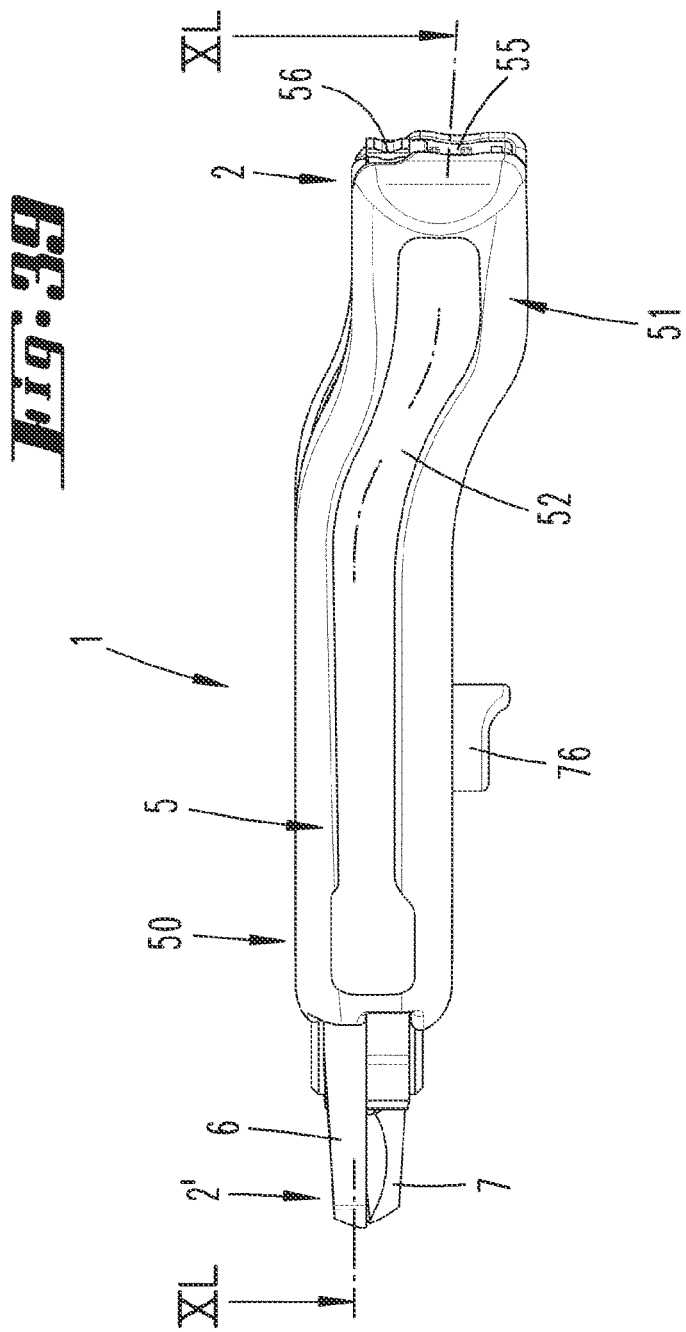

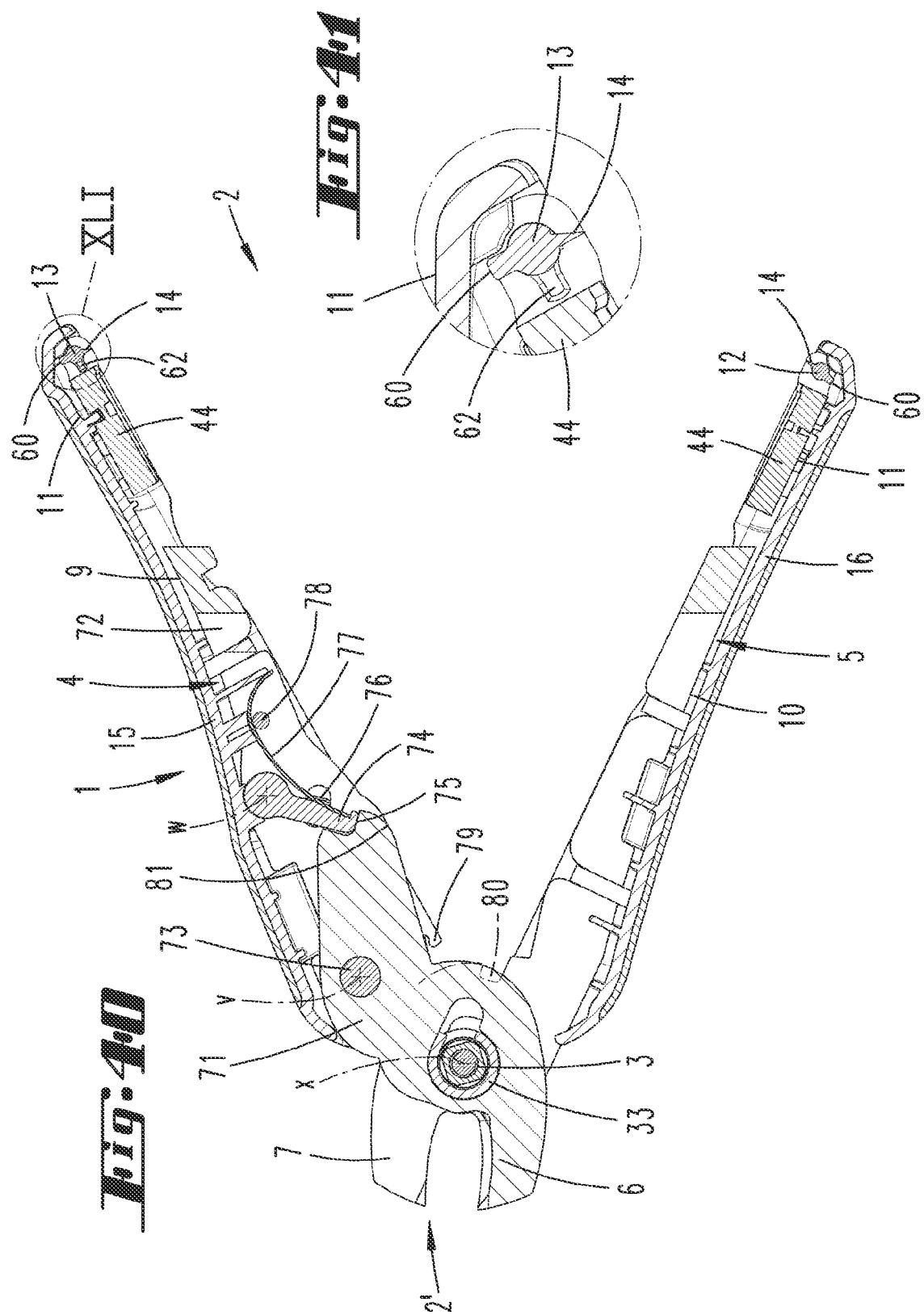

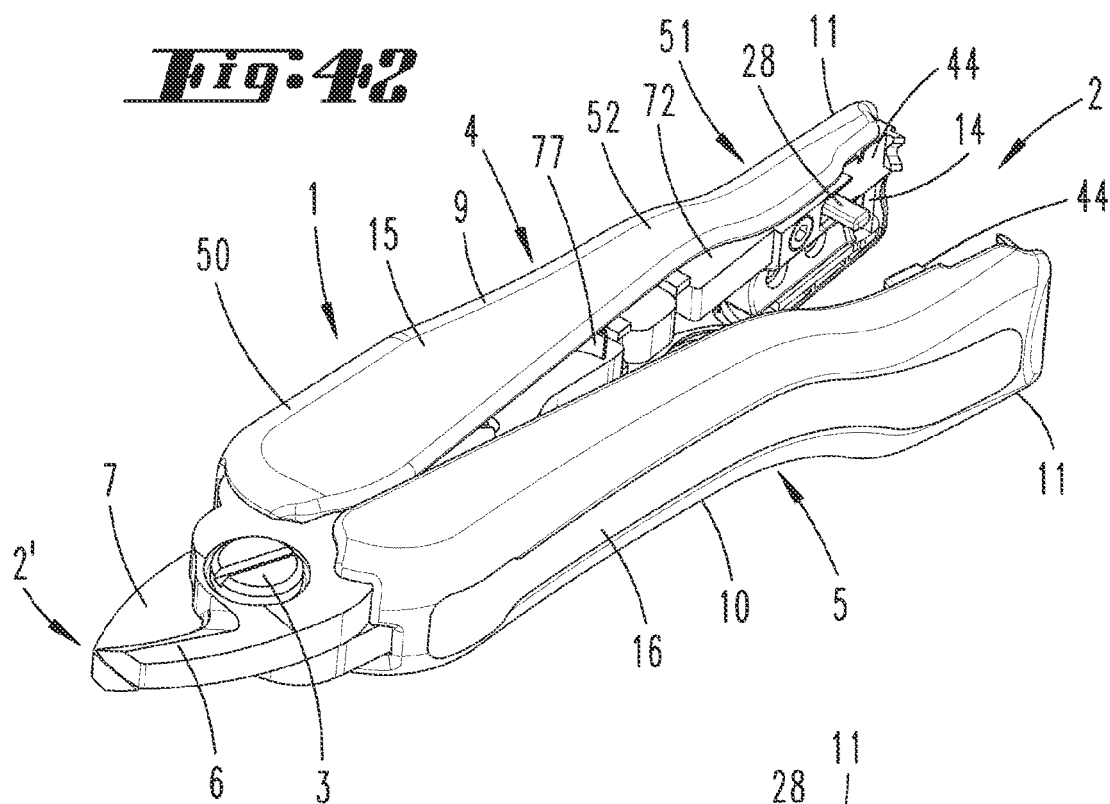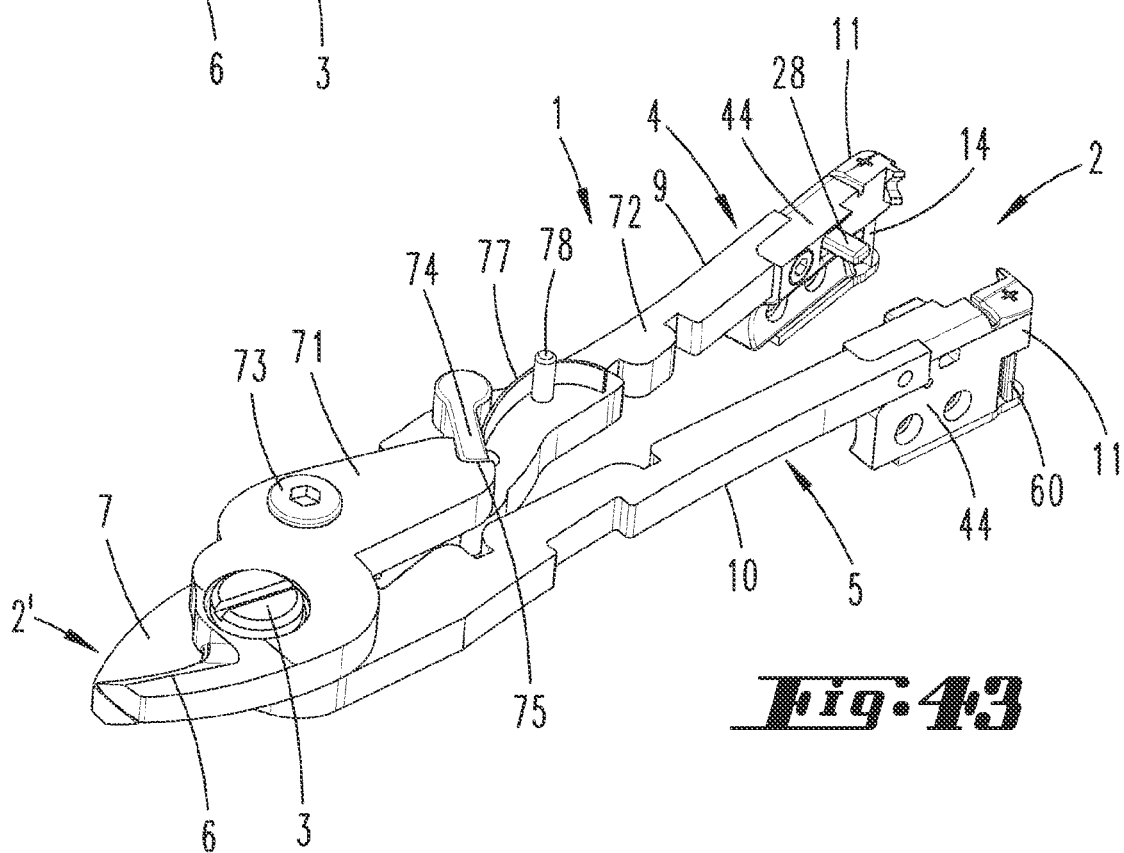

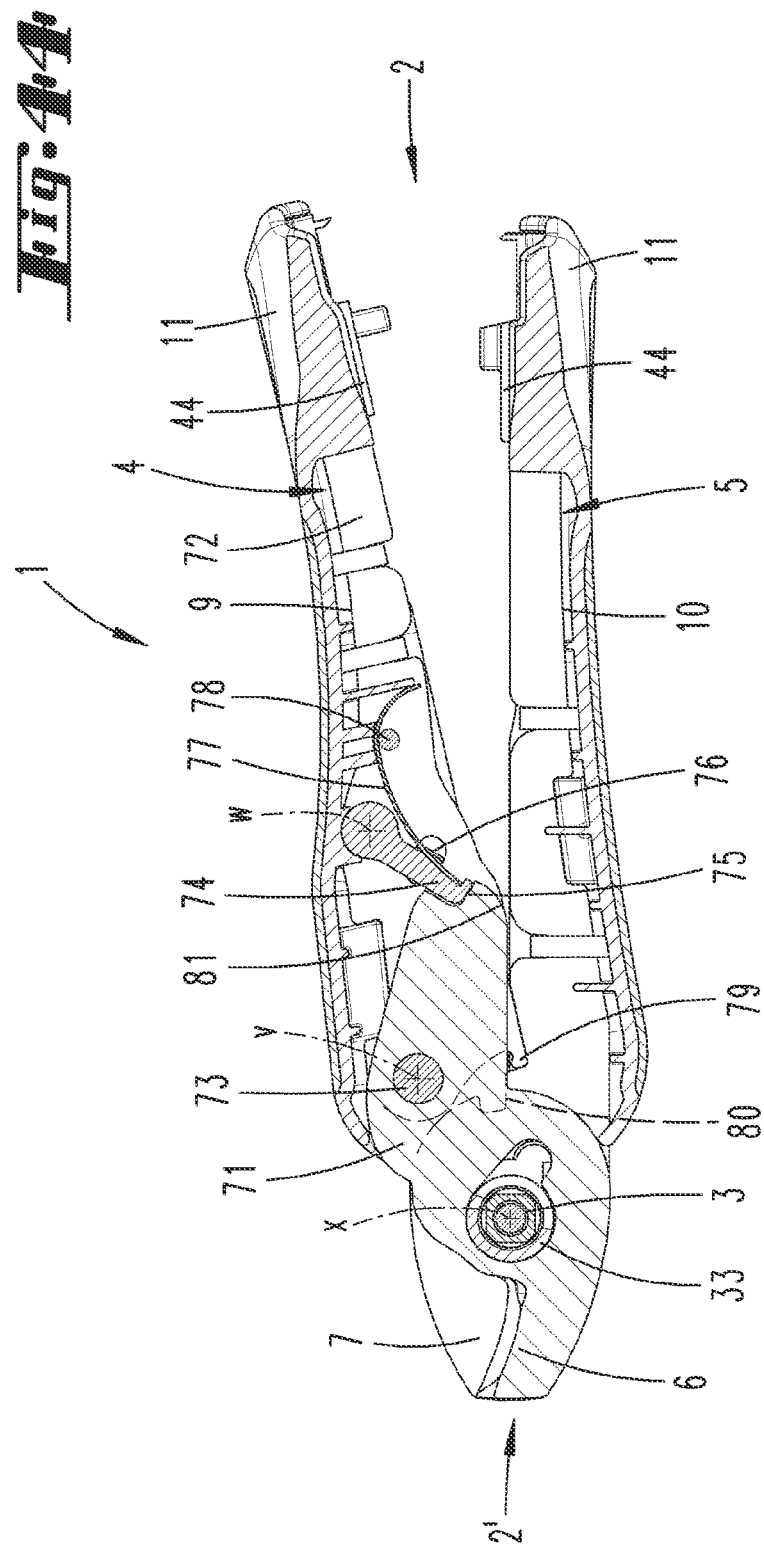

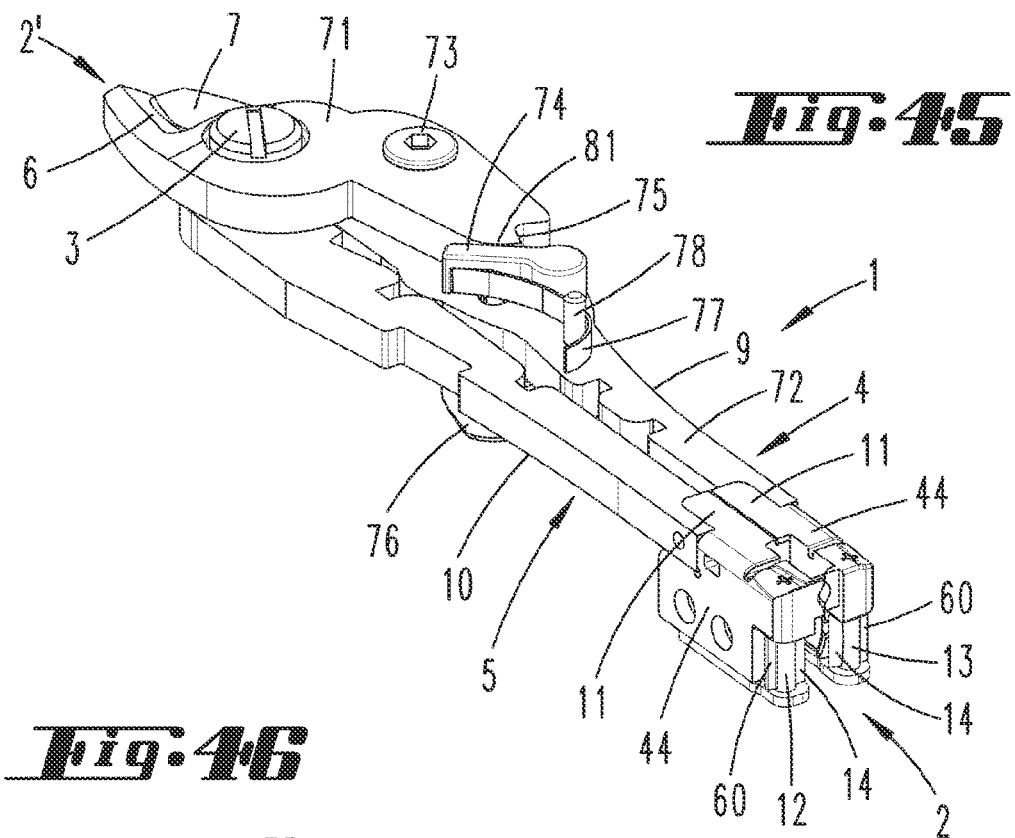
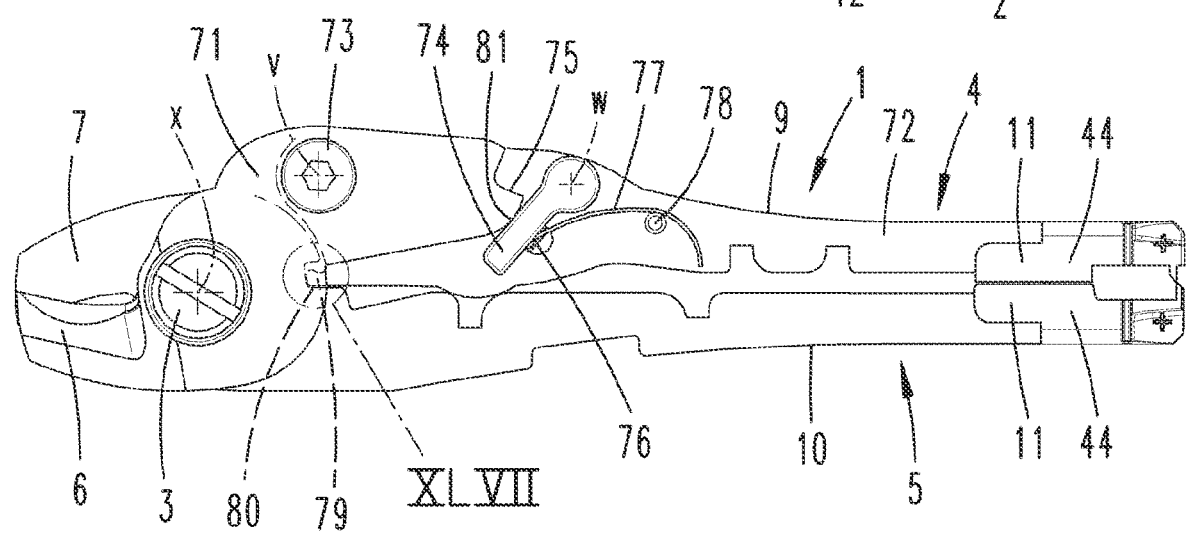
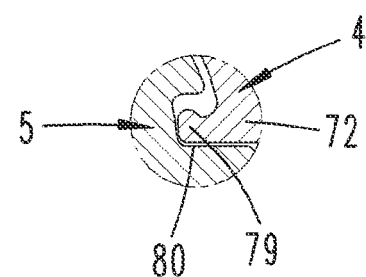

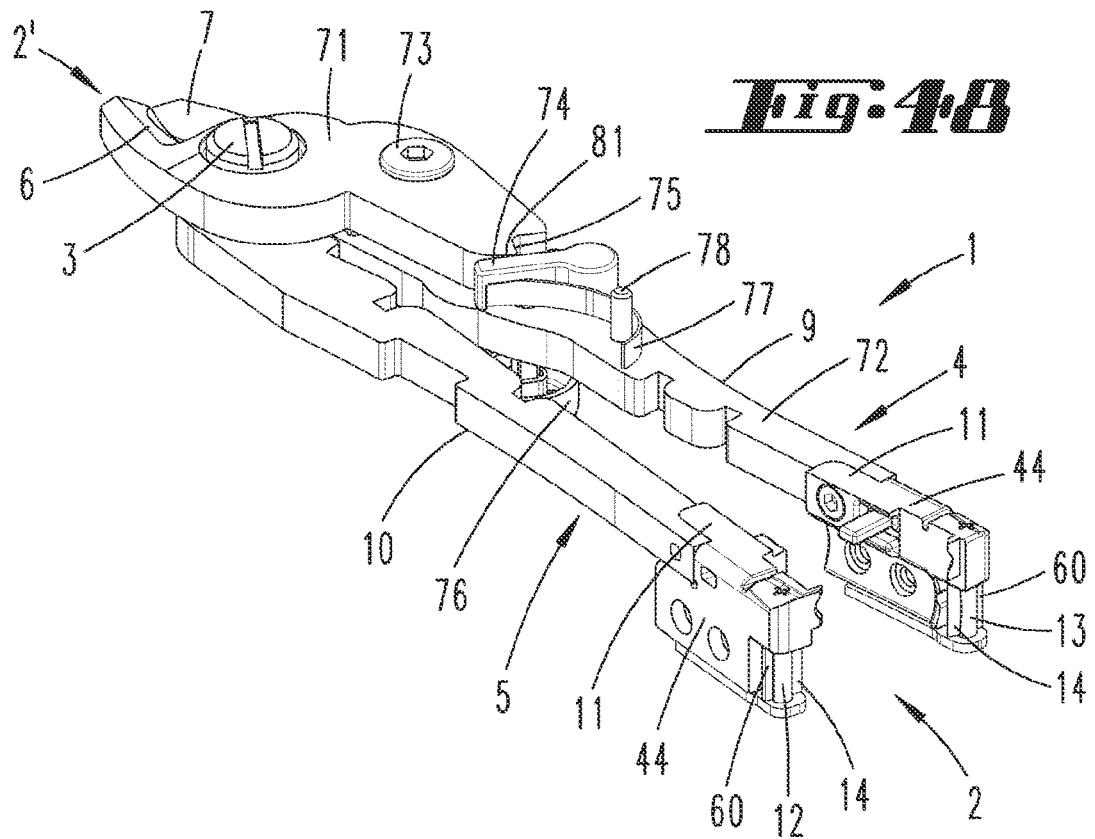
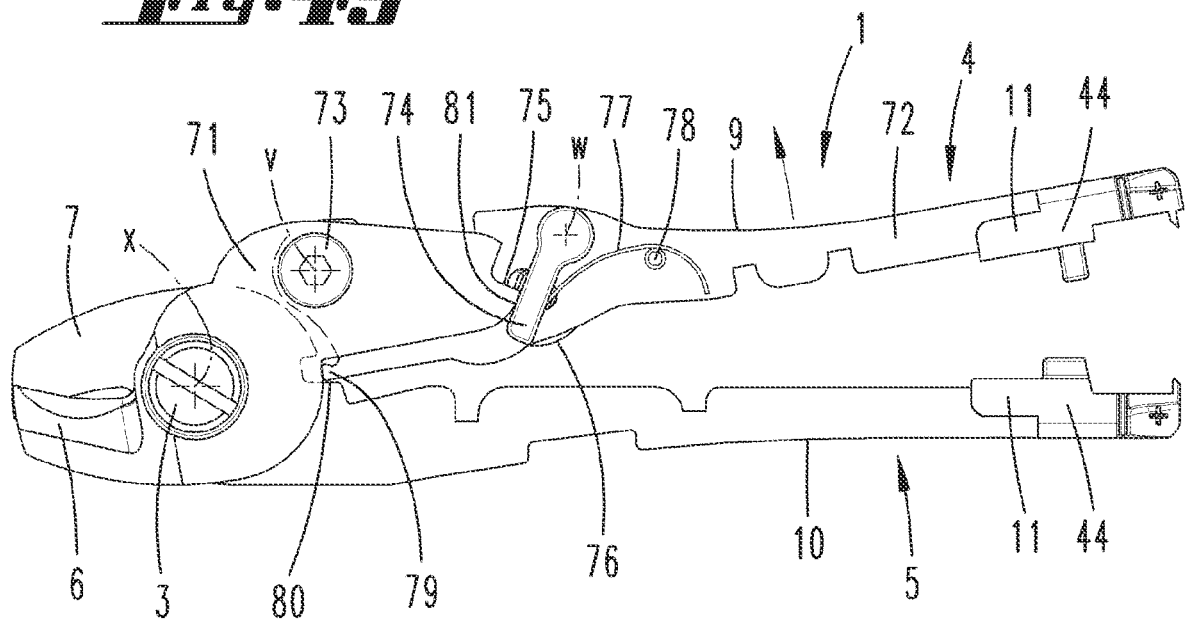

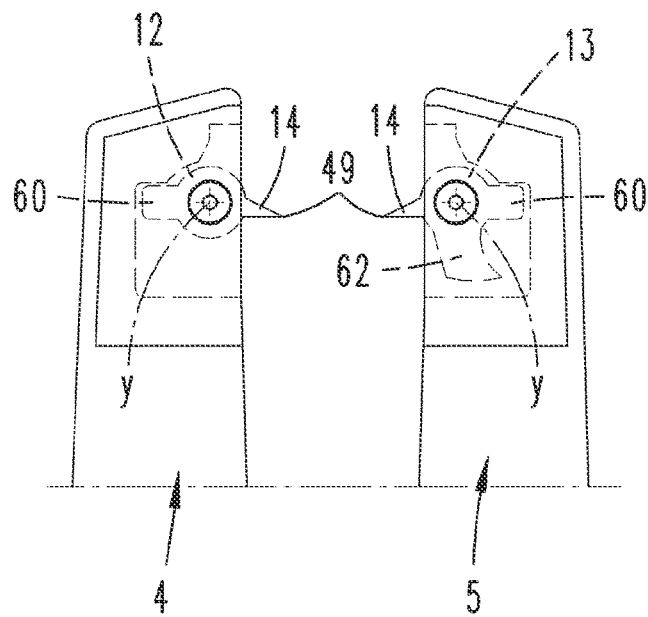
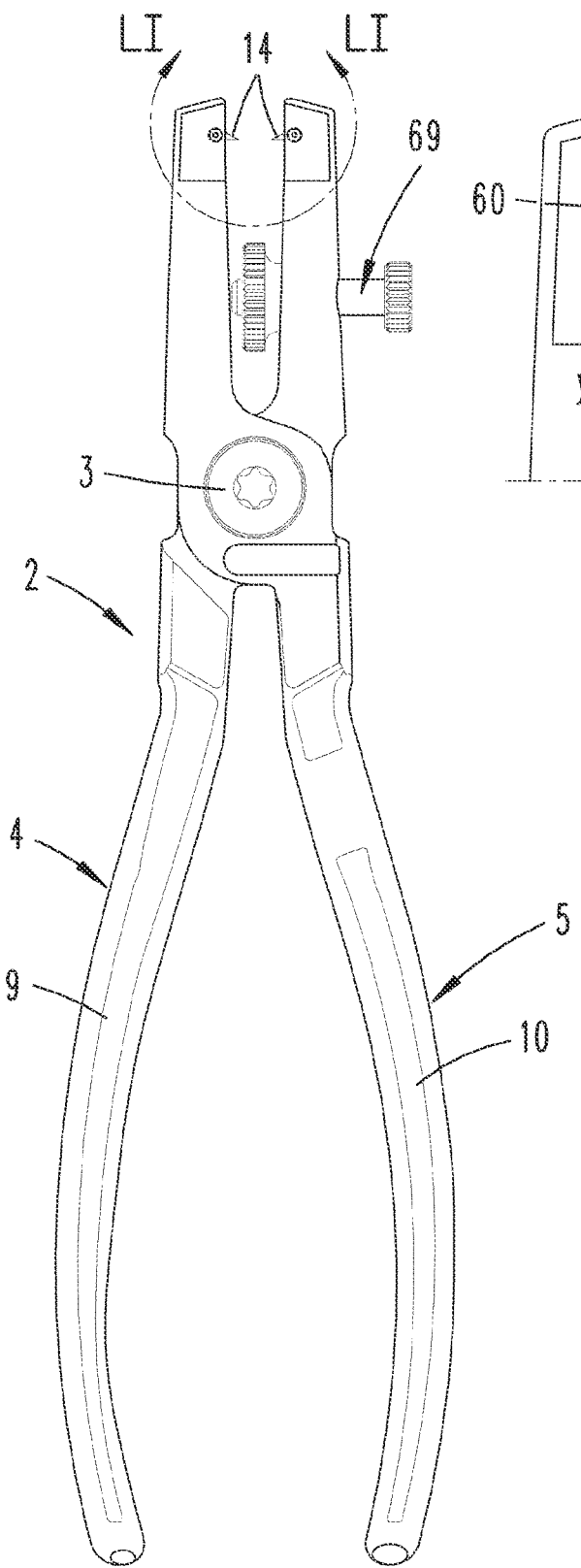

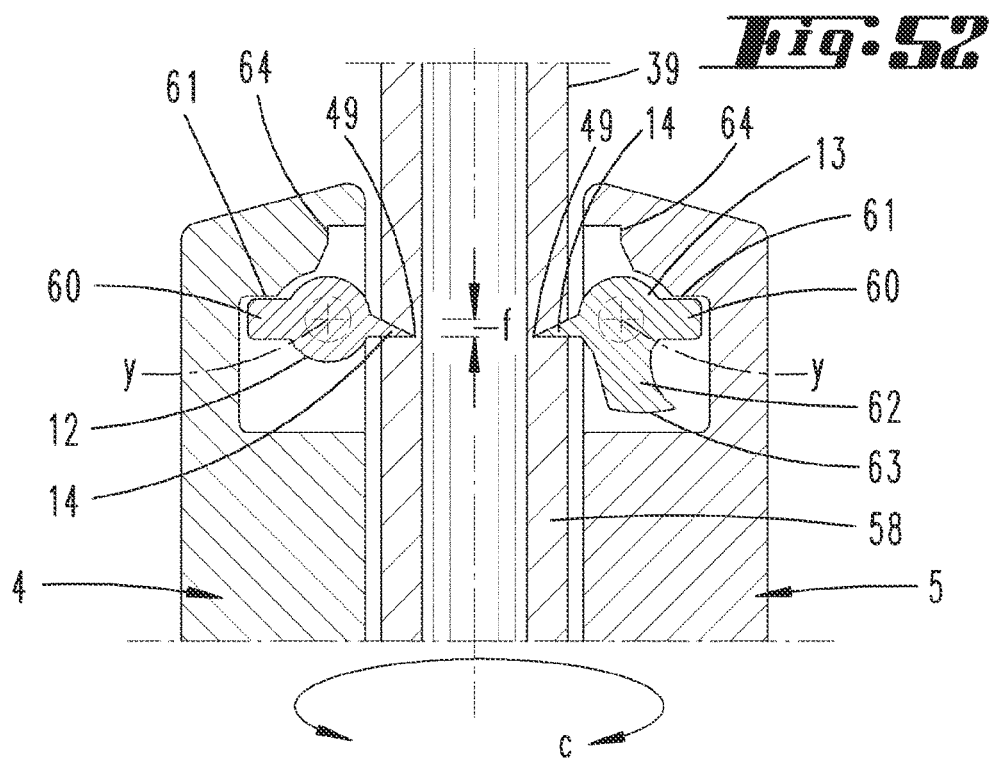
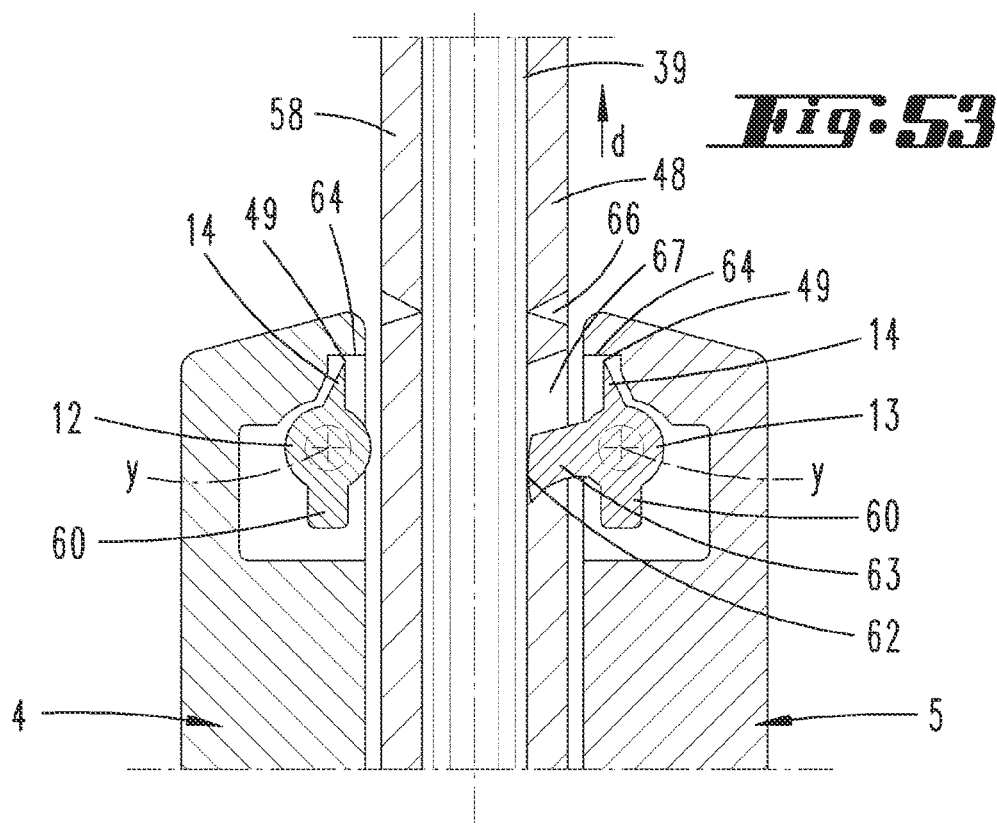

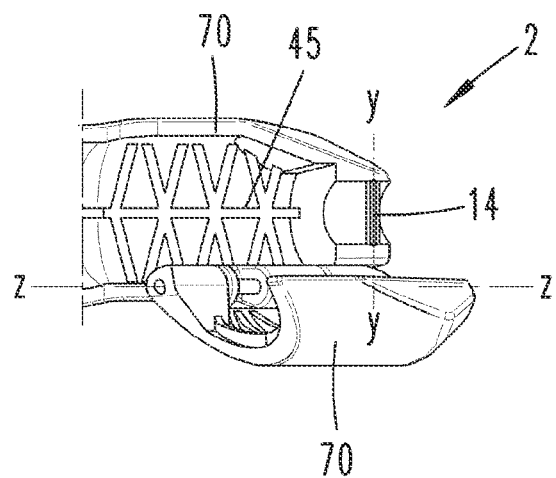
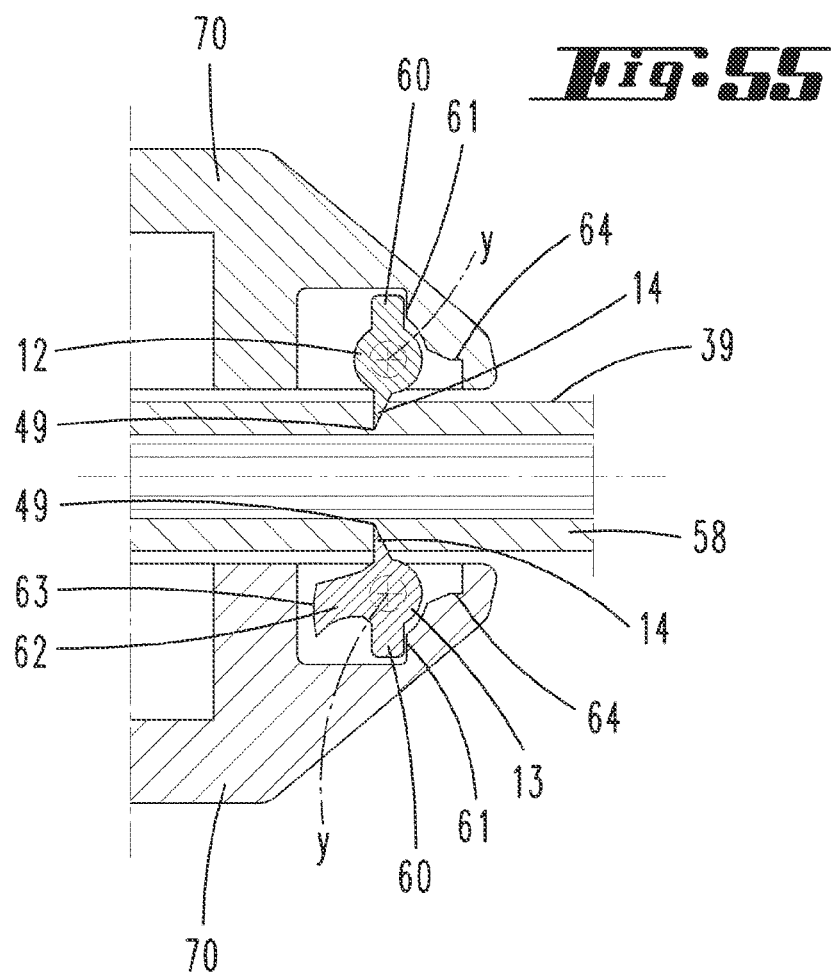

INSULATING-STRIPPING TOOL DESIGNED AS A HAND TOOL, CUTTING PART FOR AN INSULATION-STRIPPING TOOL AND METHOD FOR STRIPPING A CABLE

CROSS REFERENCE TO RELATED APPLICATIONS

This application is the National Stage of PCT/EP2020/062619 filed on May 6, 2020, which claims priority under 35 U.S.C. § 119 of German Application No. 10 2019 111 703.8 filed on May 6, 2019, the disclosure of which is incorporated by reference. The international application under PCT article 21(2) was not published in English.

AREA OF TECHNOLOGY

The invention relates firstly to an insulation-stripping tool designed as a hand tool for stripping insulation from a cable, comprising a first insulation-stripping cutter for stripping the insulation transversely to a longitudinal direction of the cable and a second insulation-stripping cutter for stripping the insulation in the longitudinal direction of the cable.

The invention further relates to a cutting part for an insulation-stripping tool configured as a hand tool for stripping insulation from a cable comprising a first insulation-stripping cutter for stripping the insulation transversely to a longitudinal direction (I) of the cable and a second insulation-stripping cutter for stripping the insulation in the longitudinal direction (I) of the cable.

The invention furthermore relates to a method for stripping insulation from a cable using an insulation-stripping tool preferably configured as a hand tool, wherein the insulation-stripping tool comprises a first insulation-stripping cutter and a second insulation-stripping cutter.

The invention finally relates to a cutting part for an insulation-stripping tool configured as a hand tool for stripping insulation from a cable transversely to its cable longitudinal direction and also for stripping the insulation in the cable longitudinal direction.

PRIOR ART

For stripping and removing insulation from a cable, it is known to use insulation-stripping tools, which comprise at least one first insulation-stripping cutter for performing a separating cut in the insulation transversely to the longitudinal extension of the cable. In particular in difficult-to-access regions, for example, distributor boxes etc. there is a need to also cut into or cut open the section to be stripped of insulation in the longitudinal direction of extension. This facilitates the removal of the insulation section. For this purpose, known insulation-stripping tools have a second insulation-stripping cutter, which, if necessary, serves to perform a cutting-open of the insulation in the longitudinal direction of the cable.

In this connection, reference is made, for example, to DE 38 08 950 A1. Known from this is an insulation-stripping tool, which substantially consists of two half-shell-like jaws, which are pivotable about a common axis toward one another into a closed position. The insulation-stripping tool, which is configured overall as elongated, has respectively one first insulation-stripping cutter in the area of one end assigned to the inner surfaces of the half-shells pointing toward one another. A cable inserted between the half-shells is cut into by the first insulation-stripping cutter in the area of its insulation upon closure of the half-shells, wherein this cutting process is assisted in particular by a turning of the insulation-stripping tool about the longitudinal axis by approximately 180° to one side and to the other side. For separation of the insulation in the longitudinal direction, the cable is initially taken from the insulation-stripping tool and inserted again turned overall by 180 degrees perpendicular to the longitudinal extension, after which a second insulation-stripping cutter arranged in the area of the other end of the insulation-stripping tool can be used for cutting open the insulation in the longitudinal direction.

Another insulation-stripping tool is known from DE 44 11 028 C1. This is configured to be pliers-like, accordingly comprising two pliers legs, wherein two first insulation-stripping cutters pointing toward one another are provided at one free end of the pliers leg for stripping the insulation transversely to the longitudinal direction of the cable. For stripping the insulation in the longitudinal direction of the cable, the cable can remain in the pliers in the pliers closed position after carrying out the stripping transversely to the longitudinal direction of the cable. A second insulation-stripping cutter is actively brought into an active position by the user. For this purpose, a slider which can be actuated with the thumbs, for example, is provided which can bring the second insulation-stripping cutter about a geometric axis of rotation from a concealed position into a lowered position penetrating into the insulation.

Known from CN 105 633 852 B is a pliers-like insulation-stripping tool in which both pliers legs are pivotable with respect to one another about a common axis of rotation. One of the pliers legs has a first and a second insulation-stripping cutter on one side of the axis of rotation in each case. The insulation-stripping cutters are connected immovably to the pliers leg.

A comparable tool is known from CN 107 342 556 A. In this tool insulation-stripping cutters are also connected immovably to the pliers leg. The same also applies with a view to U.S. Pat. No. 9,225,153 B1 and DE 36 32 685 A.

SUMMARY OF THE INVENTION

Starting from a prior art possibly according to CN 105 633 863 B, the object of the invention is to provide an insulation-stripping tool designed as a hand tool, which is configured in a manner favorable for handling. The object also consists in providing a a method, which enables a favorable stripping of the insulation from a cable in terms of handling. Furthermore, it is the object of the invention to provide a cutting part for an insulation-stripping tool configured as a hand tool, which enables a favorable handling.

The said object is achieved with regard to an insulation-stripping tool designed as a hand tool, wherein the focus is on the fact that the first insulation-stripping cutter is mounted pivotably for movement between a cutting engagement position and a release position and wherein the first and the second insulation-stripping cutters are formed on the same pivoting body and are pivotable about the same pivot axis, wherein the second insulation-stripping cutter is arranged circumferentially offset to the first insulation-stripping cutter of the pivoting body in such a manner that pivoting of the pivoting body by about 90 degrees results in a change of the first insulation-stripping cutter into a release position and change of the second insulation-stripping cutter from its release position into its cutting engagement position.

The object is further achieved with regard to an insulation-stripping tool designed as a hand tool, wherein the focus is on the fact that the first insulation-stripping cutter is pivotably mounted for movement between a cutting engagement position and a release position and that the first insulation-stripping cutter is movable between the cutting engagement position and the release position merely by an action on the insulation-stripping cutter itself via a pulling movement on the cable.

As a result of the proposed configuration, an insulation-stripping tool of the type in question is provided which allows favorable use in terms of handling. The first insulation-stripping cutter of the tool can, for example, for carrying out further work with the tool, be favorably pivoted into a position in which this first insulation-stripping cutter preferably does not penetrate or does not substantially penetrate in a cutting manner into the insulation of the cable inserted into the insulation-stripping tool. By this means, for example, in a possible tool closure position, which is used in the usual manner for stripping the insulation transversely to the longitudinal direction of the cable, a displacement of the cable in the longitudinal direction of the cable can be performed by pivoting the first insulation-stripping cutter into the release position. For example, after pivoting the first insulation-stripping cutter back into the cutting engagement position hereafter, a possible second cut can be made in the circumferential direction of the cable or alternatively a longitudinal cut for stripping the insulation in the longitudinal direction of the cable using the second insulation-stripping cutter.

With regard to the method, the object is achieved by a method for stripping insulation from a cable, wherein the focus is on the fact that the first insulation-stripping cutter is brought into engagement with the insulation of the cable in a closed position of the hand tool, that as a result of turning the cable about its longitudinal axis, a stripping of the insulation in the circumferential direction can be achieved, whereafter merely by pulling on the cable while maintaining the closed position of the hand tool, a pivoting displacement of the first insulation-stripping cutter into the release position is achieved while pivoting the second insulation-stripping cutter into the cutting engagement position.

With regard to the cutting part, the object is achieved whereby a first insulation-stripping cutter and a second insulation-stripping cutter are formed on a pivoting body pivotable about a pivot axis, wherein the first insulation-stripping cutter is configured for a cut in the direction of the pivot axis and the second insulation-stripping cutter is configured for a cut transversely to the pivot axis, and wherein the first insulation-stripping cutter is movable between the cutting engagement position and the release position by action on the insulation-stripping cutter itself via a pulling movement on the cable to be stripped of insulation.

Finally the object is solved with regard to the cutting part, wherein the focus is on the fact that a first insulation-stripping cutter and a second insulation-stripping cutter are formed on the same pivoting body pivotable about a pivot axis or that the first insulation-stripping cutter is fastened to a separate pivoting body while the second insulation-stripping cutter is formed on a second pivoting body and the two pivoting bodies are motion-coupled via a rigid connection so that each pivoting movement of the one pivoting body results in a corresponding pivoting movement of the other pivoting body, wherein the first insulation-stripping cutter is configured for a cut in the direction of the pivot axis and the second insulation-stripping cutter is configured for a cut transversely to the pivot axis and that further the first insulation-stripping cutter is movable merely by action on the insulation-stripping cutter itself between the cutting engagement position and the release position, wherein this action can be performed merely via a pulling movement on the cable, wherein this action can be performed merely via a pulling movement on the cable.

Preferably in this case the insulation-stripping cutters are arranged offset in the circumferential direction on the pivoting body. Without such an offset, a turning of the cable alone about its longitudinal axis is certainly almost impossible when insulation-stripping cutters are inserted into the insulation of a cable. On the other hand, in certain cases of application, possibly when the insulation-stripping cutters are favorably matched in the transverse direction to the diameter of the cable and the thickness of the insulation, such a situation can be accepted. In this case, a T-shaped incision of the two insulation-stripping cutters then usually results if these, as it were, have grown together.

With the offset in the circumferential direction, this ultimately also results in a T-shaped cutting pattern but with a non-cut area between the cut in the longitudinal direction and the cut in the transverse direction of the cable.

As a result of the proposed configuration, an advantageous cutting part for an insulation-stripping tool is provided. The cutting part can be used both for stripping insulation from a cable transversely to a longitudinal direction of the cable and also for stripping the insulation in the longitudinal direction of the cable. To this end, the cutting part has two correspondingly configured and aligned insulation-stripping cutters, of which in each case, one can be pivoted into the respective cutting position or can be pivoted out from this for deactivation. Preferably both insulation-stripping cutters can be pivoted into the respective cutting position or can be pivoted out from this cutting position. In the case of a lack of offset of the insulation-stripping cutters on the pivoting body in the circumferential direction, the second insulation-stripping cutter is preferably configured to be so long in the circumferential direction of the pivoting body that, for example, with a pull on the cable, an incision is made with a further region of the insulation-stripping cutter, which initially had not yet been inserted into the insulation.

The geometric pivot axis of the cutting part comprising the first and the second insulation-stripping cutter preferably extends in a parallel plane to a cutting plane predefined by the first insulation-stripping cutter. The geometric pivot axis can also extend within this cutting plane. Furthermore, the cutting plane predefined by the second insulation-stripping cutter can be directed transversely to the geometric pivot axis of the cutting part.

The offset in the circumferential direction between the first and the second insulation-stripping cutter can, as is also preferred, be more than 45 degrees, in particular approximately 75 to 105 degrees, thus for example, approximately 90 degrees, furthermore optionally however also more than 90 degrees as far as 180 degrees or more.

With regard to the method, the object is achieved whereby the first insulation-stripping cutter is brought into engagement with the insulation of the cable and is brought from the cutting engagement position into its release position by pulling on the cable.

As a result of the configuration according to the invention, a method favorable for handling is obtained. The cable to be stripped of insulation can also preferably remain in the insulation-stripping tool after performing the cut performed in the circumferential direction of the cable using the first insulation-stripping cutter. Preferably the first insulation-stripping cutter is brought from the cutting engagement position into its release position merely by pulling on the cable, preferably while pulling out from or pulling through the insulation-stripping tool. The first insulation-stripping cutter is thus brought into a position substantially or completely outside the insulation circumference.

This displacement of the first insulation-stripping cutter from the cutting engagement position into its release position can, as is also preferred, be carried out as a result of pivoting the first insulation-stripping cutter about a geometric pivot axis.

The pivot axis, in particular geometric pivot axis, of the first insulation-stripping cutter can, as is also preferred, run transversely to the longitudinal direction of the cable. A pulling movement of the cable for pivoting the first insulation-stripping cutter from the cutting engagement position into the release position is accomplished in the usual manner in the longitudinal direction of the cable and thus transversely directed to the geometric pivot axis of the first insulation-stripping cutter, whereby as a result of the engagement of the first insulation-stripping cutter in the insulation of the cable, a pulling on the cable brings about a pivoting displacement of the first insulation-stripping cutter by entrainment as far as the release position.

The pivot axis of the first insulation-stripping cutter can furthermore be aligned so that this does not cut the cable. Accordingly it is preferred that the pivot axis of the first insulation-stripping cutter runs outside with reference to a cross-section through the cable inserted in the insulation-stripping tool and further preferably at a distance from the outer circumferential line of the insulation of the cable. Optionally the geometric pivot axis of the first insulation-stripping cutter can touch the insulation of the cable in such a cross-sectional view.

The first insulation-stripping cutter can be moved between the cutting engagement position and the release position merely by action of the insulation-stripping cutter itself.

In one possible embodiment, the first insulation-stripping cutter can have a rectilinearly stretched profile. This rectilinear profile can be directed parallel to the geometric pivot axis of the first insulation-stripping cutter, alternatively for example, enclosing an acute angle of a few angular degrees, for example, 2, 3 or 5 or more degrees to the geometric pivot axis.

The first insulation-stripping cutter can also have an arcuate profile for embracing a circumferential partial area of the cable, in particular the insulation. When considered in a view in which the geometric pivot axis is represented linearly, a concave arc profile of the insulation-stripping cutter can thus be given, preferably with a radius which remains the same throughout. This radius can, as is also preferred, be selected to be larger than the radius of a largest permissible cable radius in relation to the tool having the first insulation-stripping cutter.

The arcuate profile can furthermore also be composed of different radius portions over the extension length of the insulation-stripping cutter. In addition, in the sense of the invention, an arcuate profile is also obtained, for example, with an overall v-shaped insulation-stripping cutter, which is configured to be approximately notch-shaped in relation to the resulting cutting plane.

In particular in relation to the insulation-stripping tool, it can be provided that the first and second insulation-stripping cutters are pivotable about different pivot axes. These pivot axes, in particular the geometric pivot axes, of the two insulation-stripping cutters can, as is also preferred, be aligned in the same direction. Furthermore, in such an arrangement the first and second insulation-stripping cutters can be motion-coupled, so that a pivoting of the first insulation-stripping cutter from the cutting engagement position into the release position can at the same time bring about a pivoting of the second insulation-stripping cutter from the release position into the cutting engagement position.

This can also be achieved in a configuration in which the first and second insulation-stripping cutter are pivotable about the same pivot axis. In this case, the two insulation-stripping cutters can have separate pivoting bodies, which however enable a pivoting about the same pivot axis.

According to a preferred embodiment, the first and second insulation-stripping cutters are formed on the same pivoting body. By this means, a forced pivoting displacement of the second insulation-stripping cutter is preferably achieved with a corresponding pivoting displacement of the first insulation-stripping cutter. The first and second insulation-stripping cutter can in this case preferably be arranged offset with respect to one another in the circumferential direction of the pivoting body in relation to the geometric pivot axis, for example, enclosing an offset angle of approximately 90 degrees with respect to one another in relation to a cross-section transverse to the geometric pivot axis. By means of a corresponding pivoting of the first insulation-stripping cutter by, for example, approximately 90 degrees, the second insulation-stripping cutter can be transferred into its cutting engagement position.

In a possible embodiment the hand tool can be configured to be pliers-like, wherein a first insulation-stripping cutter is formed on working areas of both pliers legs. The working areas can be formed opposite to pliers handle regions in relation to an articulation axis of the pliers legs, about which articulation axis both pliers legs are preferably pivotable, wherein further preferably the pliers legs can also be connected to one another via a relevant articulation bolt. In particular, a first insulation-stripping cutter can be formed in the region of the free end of each working area, in particular in the region of the inner side of the working area pointing in the direction of the working area of the other pliers leg. Such hand tools are known as so-called insulation-stripping pliers.

The first insulation-stripping cutters of such insulation-stripping pliers with pliers legs according to the previously described designs can be arranged pivotably for possible pivoting of the same from a cutting engagement position into a release position, wherein further at least one first insulation-stripping cutter can be motion-coupled to a second insulation-stripping cutter, for displacement of the second insulation-stripping cutter from a release position into the relevant cutting engagement position. Further, such insulation-stripping pliers can thus have a pivoting body in a working area with a first insulation-stripping cutter and a second insulation-stripping cutter arranged offset in the circumferential direction. A pivoting body can be provided in the opposite working area, which merely bears a first insulation-stripping cutter.

As a result of this configuration, such insulation-stripping pliers can be used both for stripping a cable insulation transversely to the longitudinal direction of the cable and also for stripping the insulation in the longitudinal direction of the cable.

Fundamentally, the cutting depth of the first and/or second insulation-stripping cutter in the insulation is preferably adapted to the thickness of the insulation cladding. The braids, wires, or cores to be exposed by the insulation stripping are not damaged by the cuts using the first and/or second insulation-stripping cutter.

The hand tool can also comprise two hollow-body partial shells, which are arranged pivotably about a common pivot axis, wherein a first insulation-stripping cutter is formed on the hollow-body partial shell. In this hand tool configured in such a manner, this first insulation-stripping cutter can also be designed according to the previously described explanations, namely preferably mounted pivotably about a geometric pivot axis from a cutting engagement position into a release position and back.

Furthermore both hollow-body partial shells can have such a first insulation-stripping cutter. Furthermore, a second insulation-stripping cutter preferably motion-coupled at least to a first insulation-stripping cutter can be provided in one of the hollow-body partial shells, wherein in this regard an arrangement of the first and second insulation-stripping cutter on a common pivoting body can be provided.

Furthermore, the hollow-body partial shells can form a receiving cavity for the cable. This receiving cavity is obtained in particular in a closed position of the hollow-body partial shells. The cable to be insulated can be inserted in this receiving cavity, optionally furthermore passing right through the receiving cavity entirely, in such a manner that the cable can emerge from this on both sides at the end of the receiving cavity.

The first and the second insulation-stripping cutter can be arranged so that they are assigned to the same receiving cavity, so that the cable lying in this receiving cavity can lie and remain in this receiving cavity both for cutting into the insulation in the circumferential direction and also for stripping the insulation in the longitudinal direction of the cable.

The previously described features prove to be particularly favorable with regard to the method. The cable inserted in the hand tool, for example, into the receiving cavity or between the working areas of the pliers legs is grasped in a first method step by the preferably opposite first insulation-stripping cutters of the two working areas or of the two hollow-body partial shells, this while cutting into the insulation of the cable. As a result of turning the cable about the longitudinal axis, a stripping of the insulation in the circumferential direction can be achieved, whereafter a pivoting displacement of the first insulation-stripping cutter into the release position is achieved merely by pulling on the cable while maintaining the closed position of the hand tool, preferably accompanied by pivoting of the second insulation-stripping cutter into the cutting engagement position. In this position, this second insulation-stripping cutter digs into the insulation cladding of the cable in the manner of a plough in the neighborhood of the circumferential dividing cut, wherein the cable is displaced from the hand tool or through this while maintaining the pulling movement. In the course of this movement resulting in the longitudinal direction of the cable, the second insulation-stripping cutter cuts into the insulation in the longitudinal direction of the cable, for example, in the manner of a plough. This second method step is preferably maintained as far as the free end of the cable portion pulled through the hand tool.

When the tensile loading on the first insulation-stripping cutter ceases, in particular after the cable has been pulled completely through the hand tool, the first insulation-stripping cutter and via this or at the same time as this, the second insulation-stripping cutter can be restored into the base position, which base position corresponds to the cutting engagement position of the first insulation-stripping cutter and the release position of the second insulation-stripping cutter. This restoring can be achieved, for example, as a result of a correspondingly acting spring force.

The ranges or value ranges or multiple ranges given hereinbefore and hereinafter also include with regard to the disclosure all the intermediate values, in particular in $\frac{1}{10}$ steps of the respective dimension, optionally therefore also dimensionless. For example, the specification up to 15 degrees also includes the disclosure up to 14.9 degrees, up to 14.8 degrees etc., the specification more than 45 degrees also includes the disclosure of more than 45.1 degrees, more than 45.2 degrees, etc. This disclosure can serve, on the one hand, for delimiting a said range limit from below and/or above, alternatively or additionally however for the disclosure of one or more singular values from the respective specified range.

BRIEF DESCRIPTION OF THE DRAWINGS

The invention is explained in detail hereinafter with reference to the appended drawings, which however merely show exemplary embodiments. A part which is only explained with reference to one of the exemplary embodiments and in a further exemplary embodiment is not replaced by another part as a result of the special feature emphasized here, is therefore also described for this further exemplary embodiment in any case as a possible part provided in any case. In the drawings:

FIG. 4 shows the section according to the line IV-IV in FIG. 2;

FIG. 5 shows a perspective view of the tool, relating to the cutting closed position;

FIG. 6 shows the tool according to FIG. 5 in a perspective underview;

FIG. 7 shows a side view toward the tool according to the diagram in FIG. 2 but relating to the cutter closed position;

FIG. 8 shows the front view toward the tool according to arrow VIII in FIG. 7;

FIG. 9 shows the longitudinal section through the tool according to the line IX-IX in FIG. 8;

FIG. 10 shows the section according to the line X-X in FIG. 7;

FIG. 11 shows the section according to the line XI-XI in FIG. 7;

FIG. 12 shows the enlargement of the region XII in FIG. 11;

FIG. 13 shows the section according to the line XIII-XIII in FIG. 7;

FIG. 13a shows in schematic view a locking projection in the locking position;

FIG. 14 shows in perspective view the section according to the line XIV-XIV in FIG. 7;

FIG. 15 shows a perspective sectional view corresponding to FIG. 14 but after locking the cutter closure position;

FIG. 16 shows a side view according to the diagram in FIG. 7 but with displacement of functional jaw parts configured as cable cutters into a retracted position;

FIG. 17 shows the section according to the line XVII-XVII in FIG. 16;

FIG. 18 shows the section according to the line XVIII-XVIII in FIG. 16;

FIG. 19 shows the section according to the line XIX in FIG. 18;

FIG. 19a shows a diagram according to FIG. 13a but after displacement of the locking projection into a lowered position;

FIG. 20 shows the enlargement of the region XX in FIG. 17;

FIG. 21 shows a diagram according to FIG. 16 but with a cable to be stripped of insulation received in a receiving cavity;

FIG. 22 shows a diagram corresponding to FIG. 17 but relating to the situation according to FIG. 21;

FIG. 35 shows in perspective view a pliers-like tool in the form of a cable cutter relating to a further embodiment in a cutting open position;

FIG. 36 shows a perspective view according to FIG. 35 but omitting the handle shells covering the pliers legs;

FIG. 37 shows the tool according to FIG. 35 in a perspective exploded view;

FIG. 38 shows the tool according to FIG. 35 in plan view omitting the handle shells;

FIG. 39 shows the pliers-like tool in side view;

FIG. 40 shows the pliers-like tool in a sectional view along the line XL-XL in FIG. 39;

FIG. 41 shows the enlargement of the region XLI in FIG. 40;

FIG. 42 shows a perspective diagram of the tool substantially corresponding to FIG. 35 but relating to a cutter closed position;

FIG. 43 shows the tool in a view according to FIG. 36 but relating to the cutter closed position according to FIG. 42;

FIG. 44 shows a sectional view according to FIG. 40 but relating to the tool position according to FIG. 42;

FIG. 45 shows a further perspective view of the pliers-like tool but using the same as insulation-stripping tool relating to a closed position of insulation-stripping cutters on the side of the handle area;

FIG. 46 shows the plan view to FIG. 45;

FIG. 47 shows the enlarged sectional view of the region XLVII in FIG. 46;

FIG. 48 shows a perspective view of the tool substantially corresponding to FIG. 45 omitting handle shells but relating to the open position of the insulation-stripping cutters on the side of the handle area using the tool as insulation-stripping tool;

FIG. 49 shows the plan view to the diagram in FIG. 48;

FIG. 50 shows in view a tool configured as a cable cutter in a further embodiment;

FIG. 51 shows the enlargement of the area LI in FIG. 50;

FIG. 52 shows the area shown in FIG. 51 in a longitudinal sectional view relating to the pivoting situation according to FIG. 23 of the cutting body to achieve a stripping of the insulation transversely to the longitudinal direction of the cable using the first insulation-stripping cutter;

FIG. 53 shows the pivoting position of the pivoting body while pivoting the second insulation-stripping cutter to achieve a stripping of the insulation in the longitudinal direction of the cable;

FIG. 54 shows a tool in a further embodiment substantially consisting of two hollow-body partial shells relating to an open position;

FIG. 55 shows a sectional view according to FIG. 52 but relating to the tool according to FIG. 54.

DESCRIPTION OF THE EMBODIMENTS

Figure 1:
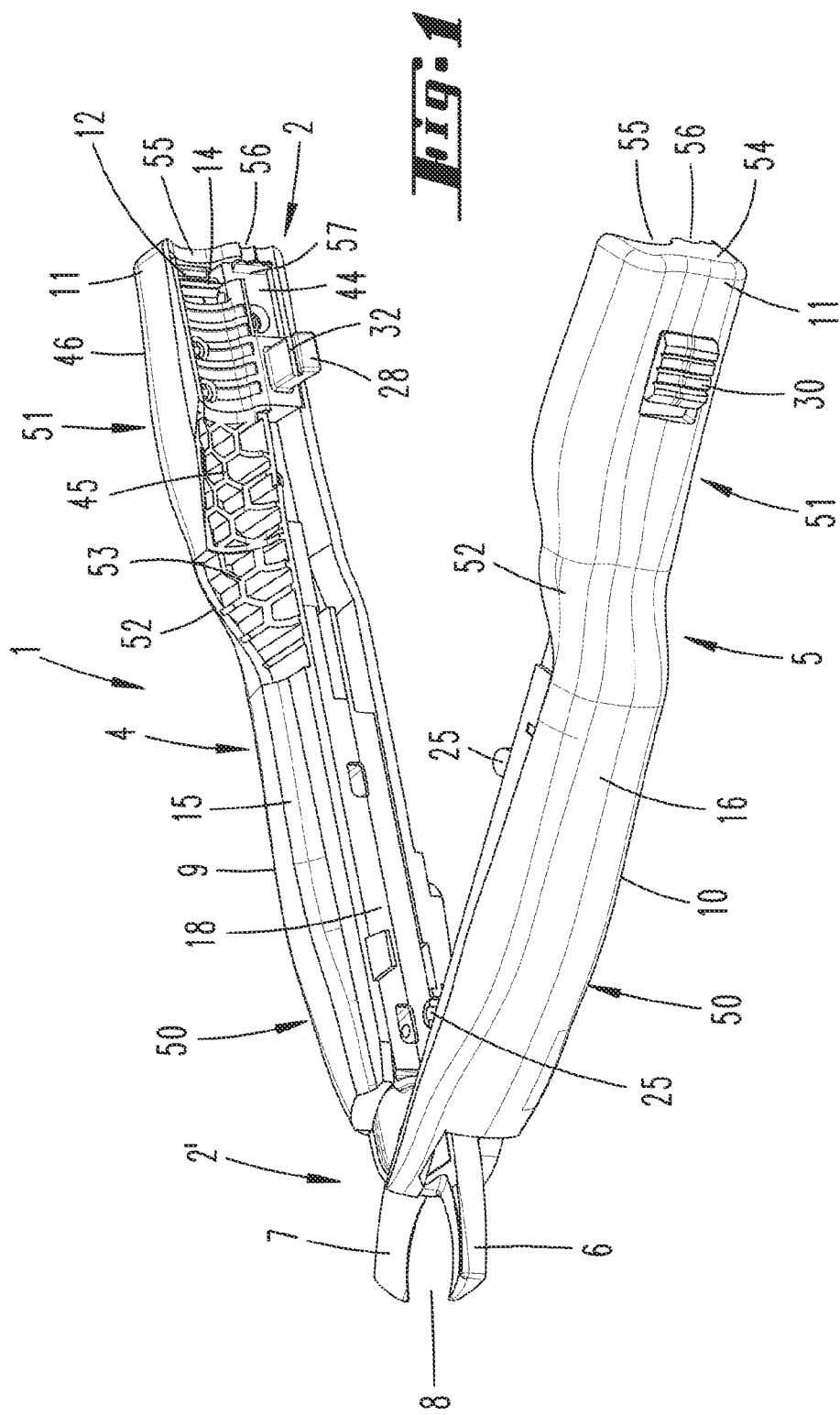
FIG. 1 shows in a perspective view a pliers-like tool in the form of a cable cutter relating to a first embodiment in a cutting open position.
Figure 2:
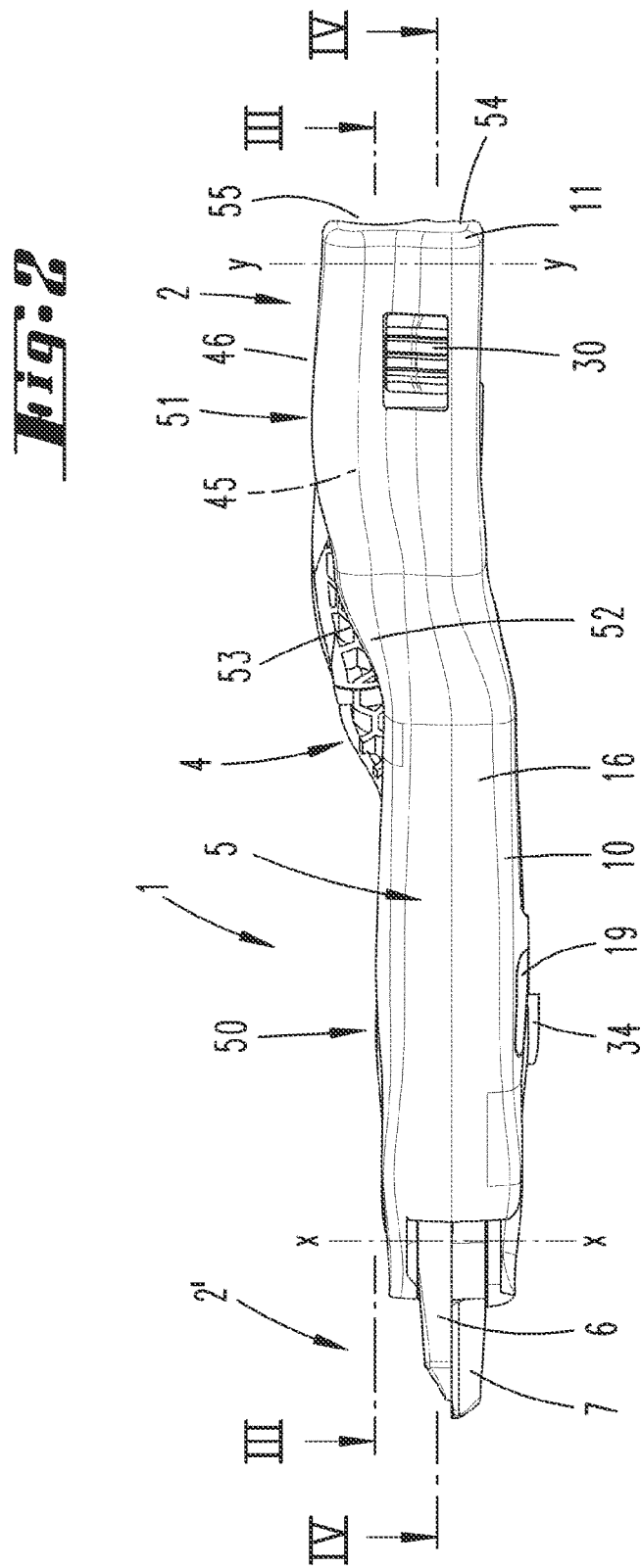
FIG. 2 shows the side view to this.
Figure 3:
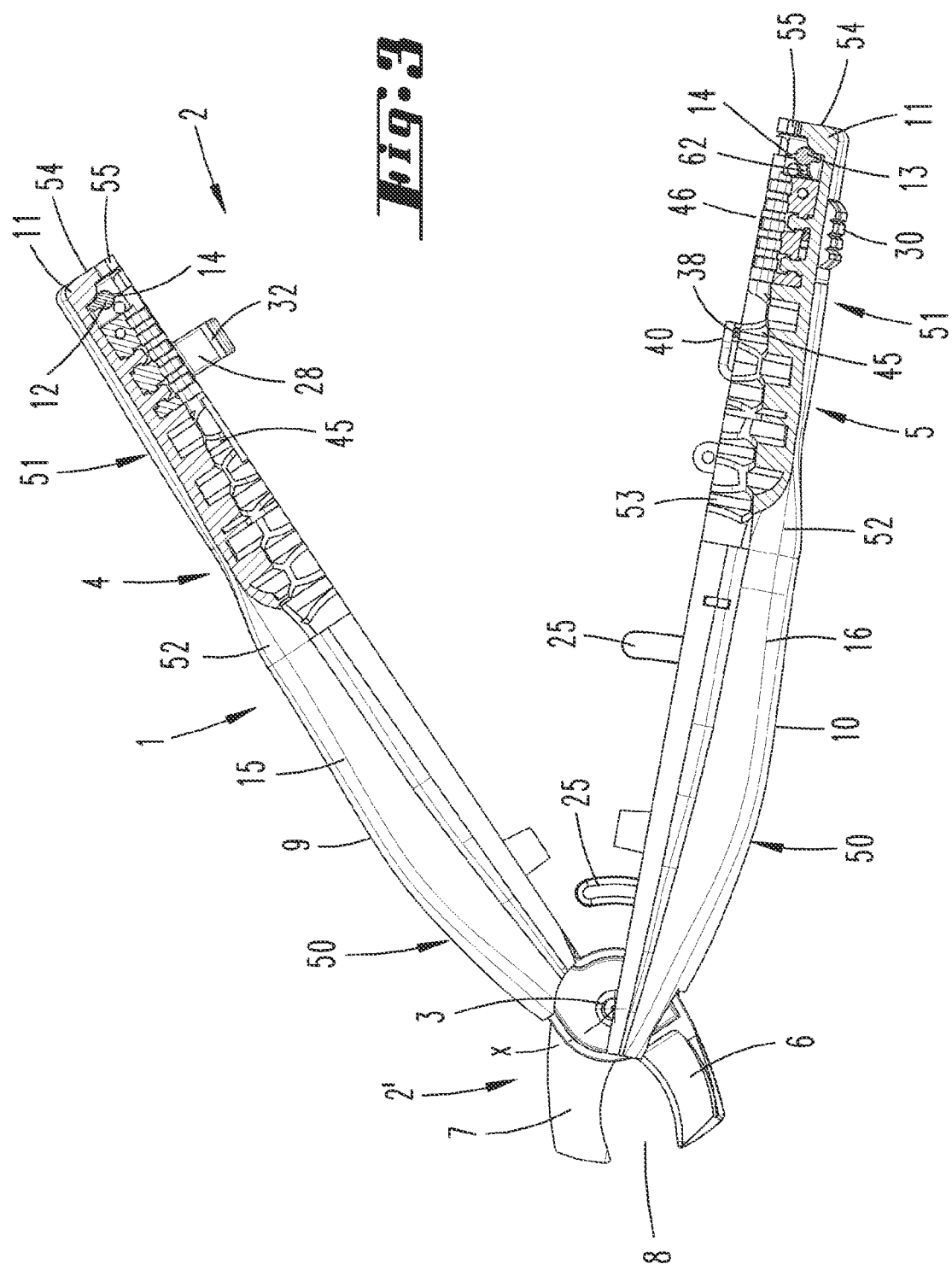
FIG. 3 shows the section according to the line III-III in FIG. 2.
Figure 23:
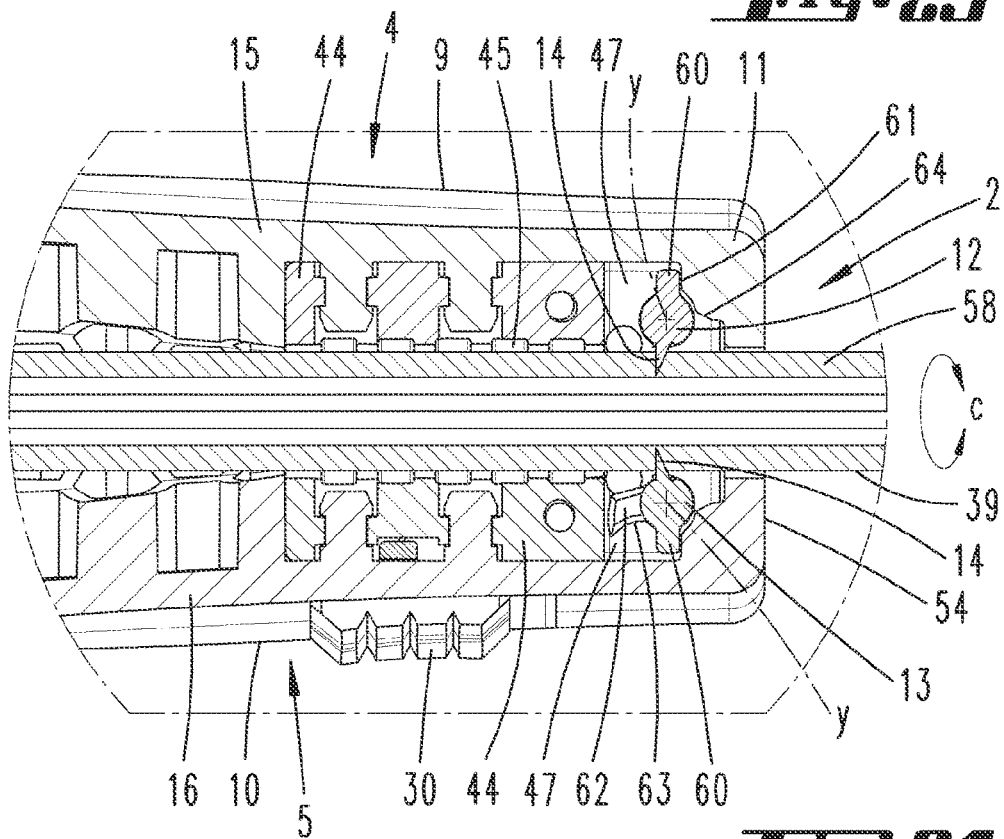
FIG. 23 shows the enlargement of the region XXIII in FIG. 22 with engagement of first insulation-stripping cutters into the insulation of the cable for stripping the insulation transversely to a longitudinal direction of the cable.

Shown and described, initially with reference to FIG. 1, is a first embodiment of a pliers-like tool 1 in the form of a cable cutter, which can also be used at the same time as insulation-stripping tool 2, wherein the tool 1 is provided with a first insulation-stripping cutter 14 for stripping of an insulation 58 of a cable 39 transversely to the longitudinal direction of the cable 1 and with a second insulation-stripping cutter 62 for stripping in the longitudinal direction of the cable 1. In particular, the first insulation-stripping cutter 14 is pivotably mounted.

The tool 1 forms at one end an insulation-stripping tool 2 and at the other end a cable cutter 2' and in this embodiment initially and substantially comprises two pliers legs 4 and 5, which are pivotably interconnected in a scissors articulation 3. The resulting geometric pivot axis x in the scissors articulation 3 extends substantially perpendicular to a longitudinal extension of the pliers legs 4, 5.

Formed on one side of the scissors articulation 3 (with reference to the longitudinal extension of the pliers legs 4, 5) on each pliers leg 4, 5 is a functional jaw part 6, 7, here in for the form of a cable cutter in each case. In the cutting open position according to FIGS. 1 to 4, a cutting mouth 8 is obtained between these functional jaw parts 6 and 7.

The cable cutters can be suitable for moving over one another in a scissors-like manner for cutting through a cable inserted in the cutting mouth 8.

Facing away from the functional jaw parts 6 and 7 the pliers legs 4 and 5 form handle regions 9 and 10 on the other side of the scissors articulation bolt 3.

When viewed in longitudinal extension of the pliers legs 4, 5, a length b of the respective handle region 9, 10 is obtained, which can correspond to a multiple of the length a of the functional jaw parts 6, 7 also starting from the pivot axis x. In the depicted exemplary embodiment, the length b of the handle regions 9, 10 in the functional jaw part usage position corresponds to approximately 5 to 7 times, further approximately 6 times the cutter length a.

In the region of the free ends 11 of each handle region 9, 10, as is also shown in the depicted exemplary embodiment, pivoting bodies 12, 13 assigned to each handle region 9, 10 can be provided with insulation-stripping cutters 14. By using these first insulation-stripping cutters 14, this tool 1 can be used as insulation-stripping tool 2.

The hand tool 1 of the embodiment according to FIGS. 1 to 28 can accordingly be used as desired in each case at the ends of the pliers legs 4, 5 as a cable cutter 2' or as an insulation-stripping tool 2.

Each handle region 9, 10 can initially comprise a handle shell 15, 16 consisting of a hard plastic, for example.

Furthermore, each pliers leg 4, 5 can also have a longitudinal division. In this case, a leg partial region 17 is arranged firmly inside the associated handle shell 15 or 16 whereas the second leg partial region 18 carrying the associated functional jaw part 6 or 7 can be displaced slidably relative to the first leg partial region 17. This sliding displaceability is directed in longitudinal extension of the pliers legs 4, 5. A telescopability of the respective pliers leg 4, 5 is the longitudinal extension of the leg can thus be obtained, wherein a T-guide or the like can be given in this respect.

The second leg partial regions 18 are preferably connected to one another via the scissors articulation 3, so that a telescopic lengthening or shortening of one pliers leg at the same time brings about a corresponding length change of the other pliers leg in the same manner.

Furthermore, a possible relative displacement of the functional jaw parts 6 and 7 formed on the second leg partial regions 18 relative to the handle shells 15 and 16 can thus be obtained so that the functional jaw parts 6 and 7 can be displaced from a protruding position according to FIGS. 1 to 15, which also corresponds to the usual usage position of the functional jaw parts 6 and 7, for example, for cutting through a cable or the like, into a retracted position in which the functional jaw parts 6 and 7 are moved substantially completely into a concealed position, substantially embraced by the handle shells 15 and 16.

Both the protruding position and also the retracted position of the functional jaw parts 6 and 7 can, as is also preferred, be secured by locking. For this purpose, a button 19, which is displaceable substantially in the direction of the pivot axis x, can be further provided on the housing outer side of one of the handle shells 15 and 16, on which button a latching pin 20 projecting into the shell interior can be formed on the underside. This latching pin 20 can dip into a longitudinal slot 21 of the associated second leg partial region 18, which can form a latching opening 22 enlarged with respect to the slot width at the ends in each case.

The latching openings 22 can be adapted according to the diagrams circumferentially to the cross-sectional shape of the latching pin 20.

For cancelling a latching position, the latching pin is displaceable in alignment of the pivot axis x preferably against the restoring force of a spring 23 acting on the latching pin 20 into a position in which a waist-like tapered portion 24 of the latching pin 20, which is adapted to the width of the longitudinal slot 21, allows a displacement of the latching pin 20 along the longitudinal slot 21 in the direction of the other latching opening 22.

The latching position found, as is also preferred, can be found automatically as a result of the restoring force of the spring 23.

As can be seen, for example, from the diagram in FIG. 4, the second leg partial region 18 also comprising the longitudinal slot 21 with the latching openings 22 can have guide projections 25 on its inner side, facing the second leg partial region 18 of the other pliers leg, which in particular in the course of a tool closing movement can dip into corresponding recesses 26 of the other second leg partial region 18 possibly positively.

The telescopically displaceable second leg partial regions 18 with respect to the first leg partial regions 17 can be loaded in the telescoping direction via a further spring 27, in particular in the form of a cylinder compression spring. This spring 27, as is also shown, can be provided in the second leg partial region 18, which also comprises the longitudinal slot 21 with the latching openings 22.

Via the connection to the scissors articulation 3, the restoring force of the spring 27 also acts on the second leg partial region 18 of the other pliers leg.

Via the spring 27 the functional jaw parts 6 and 7 are loaded in the direction of their protruding position. Accordingly, this results in a back-displacement of the same into the retracted position after cancelling the locking against the restoring force of the spring 27. This must be overcome accordingly.

Another projection 28, which projects over the dividing plane E between the pliers legs 4 and 5 or between the handle shells 15 and 16, is formed on the pliers leg 4. In the tool closure position, for example, according to FIGS. 10 and 11, this is accommodated in a recess 26 in the region of the handle shell 16 of the other pliers leg 5. This projection 28 can be used for locking the tool 1 in the tool closure position, which at the same time also corresponds to the functional jaw part closure position. For this purpose, a, for example, thumb-actuatable slider can be provided on the pliers leg 5 comprising the recesses 29 on the outside of the relevant handle shell 16, which with a locking projection 31 that is slidingly displaceable in the direction of the recess 29, can retracted into a locking groove 32 formed on the projection 28. The locking groove 31 is in this case directed transversely to the opening or closing direction of the pliers legs 4 and 5.

In the tool closed position, the inner surfaces facing one another or the circumferential faces of the pliers legs 4, 5 facing one another, in particular the handle shells 15 and 16, abut against one another (compare FIG. 17).

Another spring 33 which substantially surrounds the scissors articulation bolt in the scissors articulation 3 can act on the pliers legs 4 and 5 in such a manner that these are loaded tendentially into an open position by the spring 33 according to the diagrams 3 and 4, for example.

The displacement of the pliers legs 4 and 5 for example into a cutting position of the functional jaw parts 6 and 7 configured as cable cutters or into a tool closure position takes place accordingly contrary to the force of the spring 33.

A further possible locking of the pliers legs 4 and 5 with respect to one another can be made possible by a fixing part 34 mounted pivotably parallel to the pivot axis x, which part can be brought outside a handle shell 15 with a side arm 35?? and a locking projection 36 provided at the end of the side arm behind a locking shoulder 37 in the region of the other handle shell 16.

In order to use the hand tool 1 as an insulation-stripping tool 2, the functional jaw parts 6 and 7 should preferably be moved into their retracted position. In order to prevent use of the insulation-stripping tools when the functional jaw parts 6 and 7 remain in the protruding position, a locking projection 38 can be provided, which in the functional-jaw-part protruding position projects into the dividing plane E in a hindering manner such that a movement of the pliers legs 4 and 5 into the contact position—tool closure position—is prevented. This situation is shown in a simplified manner in FIGS. 13 and 13a.

In the diagrams the locking projection 38 is aligned substantially vertically. This corresponds to the position of the locking projection 38 in the functional-jaw-part protruding position. The facing front faces of the handle shells 15 and 16 cannot come into their contact position as a result of the rising locking projection 38. However, this contact position is necessary for the correct use of the pivoting bodies 12 and 13 comprising the first insulation-stripping cutters 14 for stripping the insulation from the cable 39.

In this position, the locking projection 38 can also engage in a receiving cavity 45 in such a manner that a cable 39 to be stripped of insulation can be prevented from being introduced into the tool 1 through this receiving cavity 45 for carrying out the insulation-stripping process.

In the locking position, for example, according to FIGS. 11 and 13, a gap S is obtained in particular in the region of the free ends 11 as a result of the locking projection 38 pivoted in a perturbing manner into the dividing plane E.

The closure position is required for correct insulation stripping of a cable 39, which can only be achieved in the functional-jaw-part retracted position.

With retraction of the functional jaw parts 6 and 7, a pivoting displacement of the locking projection 38 is brought about via a control side arm 40 and a control cam 41 formed in this side arm. This locking projection sits with a control cam 42 in the control cam 41 and is pivotable about an axis 43 fixed in the associated handle shell 16 or the associated pliers leg 5. The relevant geometric axis is aligned transversely to the pivot axis x of the pliers legs 4 and 5.

FIGS. 19 and 19a show the pivoting position of the locking projection 38 after displacement of the functional jaw parts 6 and 7 into the retracted position. As can be seen, a pivoting displacement is achieved here via the control cam 41 which allows abutment of the front faces of the handle shells 15 and 16 facing one another or the pliers legs 4 and 5. In this position, the locking projection 38 can also be pivoted out of the receiving cavity 45.

With displacement of the functional jaw parts 6 and 7 back into their protruding position, in particular the control side arm 40 can be displaced back into its base position, for example, under spring loading, this being accomplished while raising the locking projection 38 via the control cam 41.

The pivoting bodies 12 and 13 can, as is also shown, each be held pivotably on a block-like insert 44. These inserts 44 can each be fastened in the region of the free ends 11 on the inside of the handle shells 15 and 16, wherein further the inserts 44 in the contact position, which corresponds to the tool closure position, can form a receiving cavity 45. The receiving cavity 45 extends substantially in the direction of longitudinal extension of the pliers legs 4, 5 or in the direction of longitudinal extension of the tool 1 overall.

Furthermore the receiving cavity 45 extends over a partial region of the handle regions 9, 10, which can correspond to approximately a quarter to a third of the total length of the pliers legs 4, 5.

The previously described projection 28 can be formed on one of the inserts 44 and the relevant recess 29 on the opposite insert 44.

The pivoting bodies 12 and 13 can each be arranged at the end of the inserts 44, assigned to the free end 11, this further preferably in the region of a notching 47 of the inserts 44. In this step-like notching the pivoting bodies 12 and 13 find a guide which allows a pivoting of the pivoting bodies 12 and 13 about a pivot axis y. This guide can, as is also preferred, be substantially a base-side guide. A top-side guide of the pivoting bodies 12, 13 can be achieved by tabs 48, which can be fastened onto the inserts 44.

The pivot axis y of the pivoting bodies 12 and 13 preferably extends in alignment of the pivot axis x in the region of the scissors articulation 3.

Preferably the first insulation-stripping cutters 14 facing one another in a base position also extend in the direction of extension of the pivot axis y. These are fixed on the circumference of the respective pivoting body 12, 13 on these.

Figure 33:
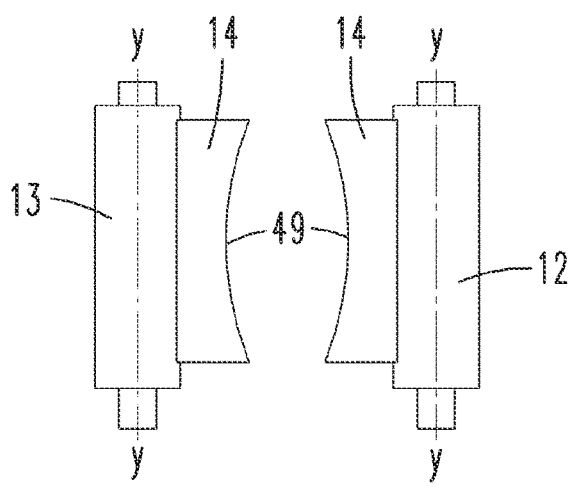
FIG. 33 shows the two pivoting bodies with an alternative configuration of the first insulation-stripping cutters.
Figure 34:
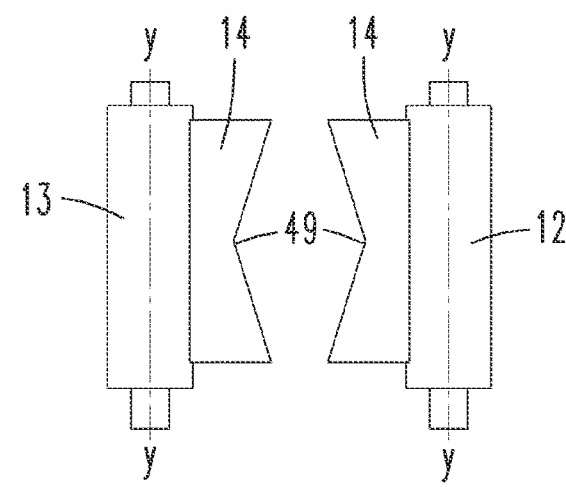
FIG. 34 shows a further alternative configuration of the first insulation-stripping cutters.

The first insulation-stripping cutters 14 can, as shown, have a rectilinear cutting edge 49 running parallel to the pivot axis y but alternatively also, as is further shown in FIGS. 33 and 34, for example, an arcuate profile for embracing a circumferential partial region of the cable 39 or also a V-shaped notch-like profile.

The handle regions 9 and 10 can comprise with regard to their longitudinal extension a first longitudinal portion 50 and a second longitudinal portion 51, wherein the second longitudinal portion 51 is assigned to the free end 11. As can be seen in particular from the longitudinal sectional view in FIG. 9, a parallel displacement of the longitudinal portions 50 and 51 with respect to one another can be obtained, wherein the two longitudinal sections 50 and 51 substantially each run in longitudinal extension of the pliers legs 4 and 5.

The degree of offset of the longitudinal portions 50 and 51 in the direction of the pivot axis x can be adapted to a largest cable diameter usually permissible for this tool 1.

The two longitudinal portions 50 and 51 go over into one another in a region of curvature 52. An opening 53 is provided in this region of curvature 52. This forms the opening of the receiving cavity 45 in the direction of the first longitudinal portion 50 while a further opening 55 is provided rearward of the handle shells 15 and 16 in the region of a relevant front wall 54. Accordingly, an opening on both sides of the receiving cavity 45 when viewed in longitudinal extension is obtained.

The pivoting bodies 12 and 13 can substantially be arranged in a region between the receiving cavity formed by the inserts 44 and the opening 55 on the front wall side.

Further openings 56 can be provided below the opening 55 in the front wall 54, assigned to rigid insulation-stripping blades 57 fastened on the inserts 44, in particular for stripping the insulation from cores.

For stripping the insulation from a cable 39 this is inserted into a receiving cavity 45 (see, for example, FIGS. 21 and 22). An end optionally guided through the receiving cavity 45 or a cable portion, after passing through the opening 53, can rest on the facing surface of the pliers legs 4 and 5, for which the handle shells 15 or 16 can optionally have a bead-like recess running in the longitudinal direction.

With closure of the pliers legs 4 and 5, wherein a changed lever ratio is established in the retracted position of the cable cutters 6 and 7, as a result of a shortening of the length b between the pivot axis x and the free end 11 as a result of the telescoping, the first insulation-stripping cutters 14 cut into the insulation 58 in a secant-like manner. This incision can be accomplished as a result of the arrangement of two first insulation-stripping cutters 14 diametrically opposite one another.

By turning in the direction of the arrow c of the cable 39, a stripping of the insulation 58 can be achieved transversely to the longitudinal direction of the cable 1 and therefore in the circumferential direction.

In particular with longer portions to be stripped of insulation, it proves to be favorable to also strip the portion to be stripped in the longitudinal direction of the cable 1. This is accomplished in the proposed insulation-stripping tool 2 in a manner favorable for handling after carrying out the stripping in the circumferential direction by pulling on the cable 39 in direction d.

Figure 24:
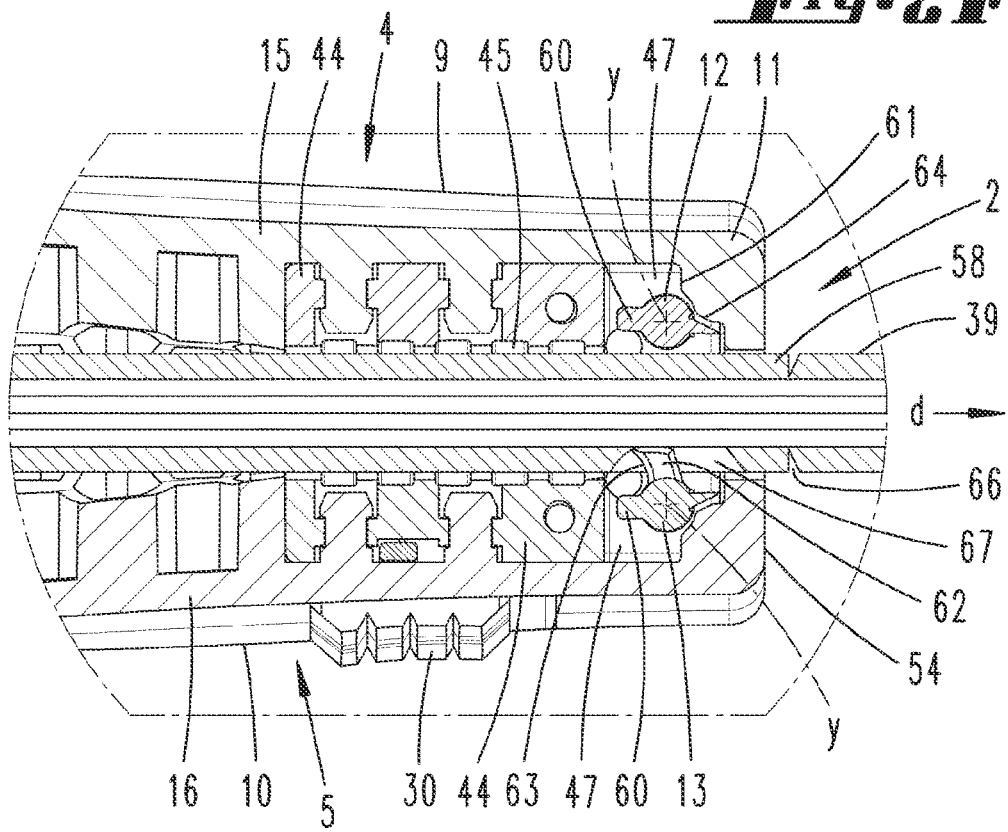
FIG. 24 shows a diagram substantially corresponding to FIG. 23 but after displacement of the first insulation-stripping cutters into a release position and displacement of a second insulation-stripping cutter into a cutting engagement position for stripping of the insulation in the longitudinal direction of the cable.
Figure 25:
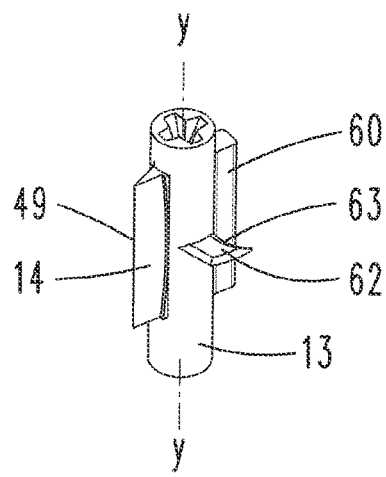
FIG. 25 shows in a perspective individual view a pivoting body with a first and a second insulation-stripping cutter.
Figure 26:
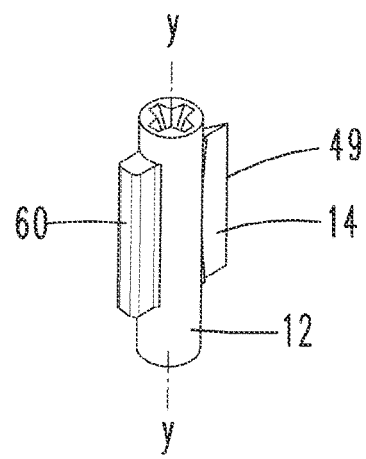
FIG. 26 shows in perspective individual view a further pivoting body with a first insulation-stripping cutter.

As a result of this pulling, the first insulation-stripping cutters 14 are pivoted from the cutting engagement position (compare FIG. 23) into a release position according to FIG. 24 as a result of the pivotable mounting of the pivoting bodies 12 and 13, wherein the pivot axis y of the pivoting bodies 12 and 13 runs outside and at a distance from the insulating cladding.

The pivoting displacement of the first insulation-stripping cutters 14 can, as is also preferred, be accomplished merely by acting on the first insulation-stripping cutters 14 via the cable 39 or the insulation 58 in the course of the loading on the cable 39 in the direction of tension.

Furthermore, this pivoting displacement of the first insulation-stripping cutters 14 about their pivot axis y can be accomplished against the force of a restoring spring 59 which urges the pivoting bodies 12 and 13 into their base position. This base position is preferably stop-limited. For this purpose, the pivoting bodies 12 and 13 have a stop shoulder 60 diametrically opposite the first insulation-stripping cutters 14 in relation to the cross-section according to FIG. 23, which in the base position according to FIG. 23 can come up against a stop surface 61 in the handle region 9 or 10.

With pivoting of the first insulation-stripping cutters 11 into the release position, a second insulation-stripping cutter 62 is preferably displaced into its cutting engagement position. In this cutting engagement position the second insulation-stripping cutter 62 dips into the insulation 58 of the cable 39.

Figure 31:
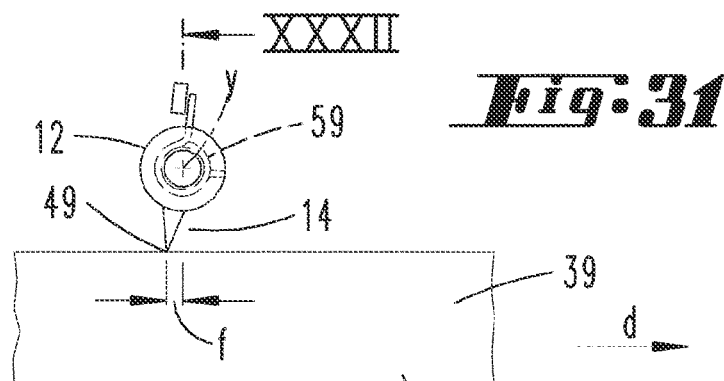
FIG. 31 shows a schematic diagram substantially corresponding to FIG. 29 relating to the arrangement of two pivoting bodies with first and second blades, substantially corresponding to those of the first exemplary embodiment.
Figure 32:
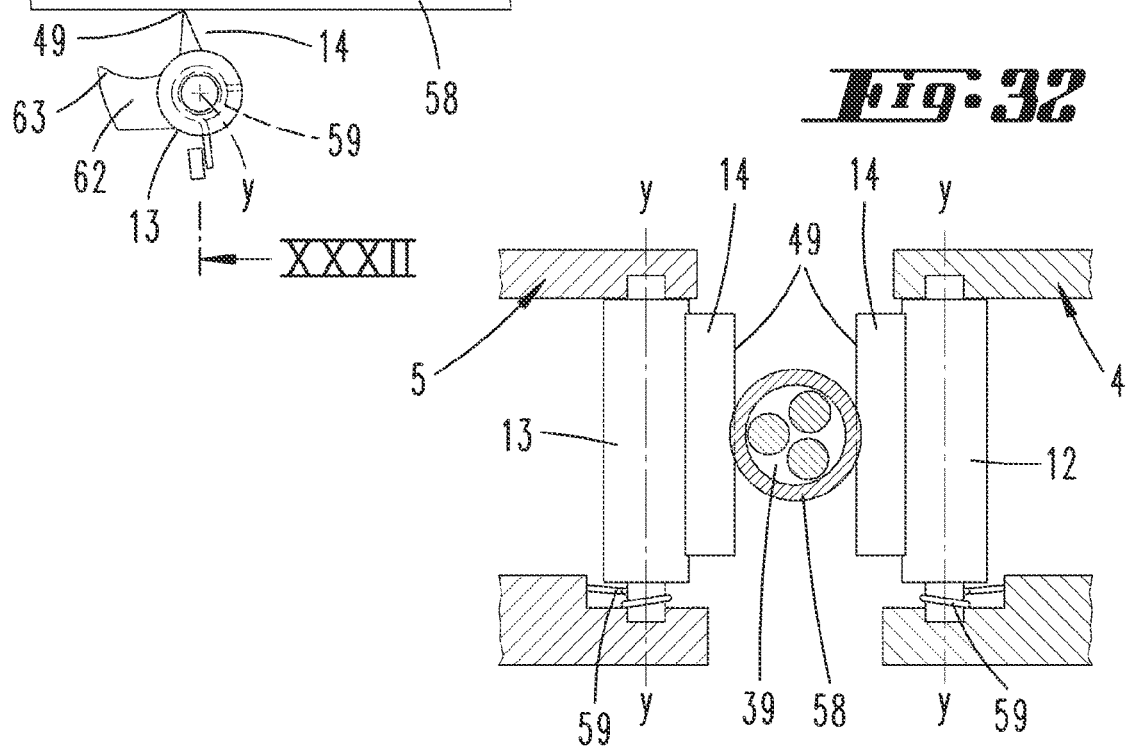
FIG. 32 shows the schematic section along the line XXXII-XXXII in FIG. 31.

In this case, the second insulation-stripping cutter can be arranged on one of the pivoting bodies, here preferably the pivoting body 13, according to the exemplary embodiment shown in FIGS. 1 to 28, as is further also shown in FIGS. 31 and 32. Thus, in this embodiment, this second insulation-stripping cutter 32 is pivotable about the same pivot axis y.

The second insulation-stripping cutter 62 can in this case, when viewed in the circumferential direction of the relevant pivoting body 13, be arranged circumferentially offset to the first insulation-stripping cutter 14. A pivoting of the pivoting body by approximately 90 degrees results in a change of the first insulation-stripping cutter into a release position and a change of the second insulation-stripping cutter 62 from its release position into the cutting engagement position.

Figure 29:
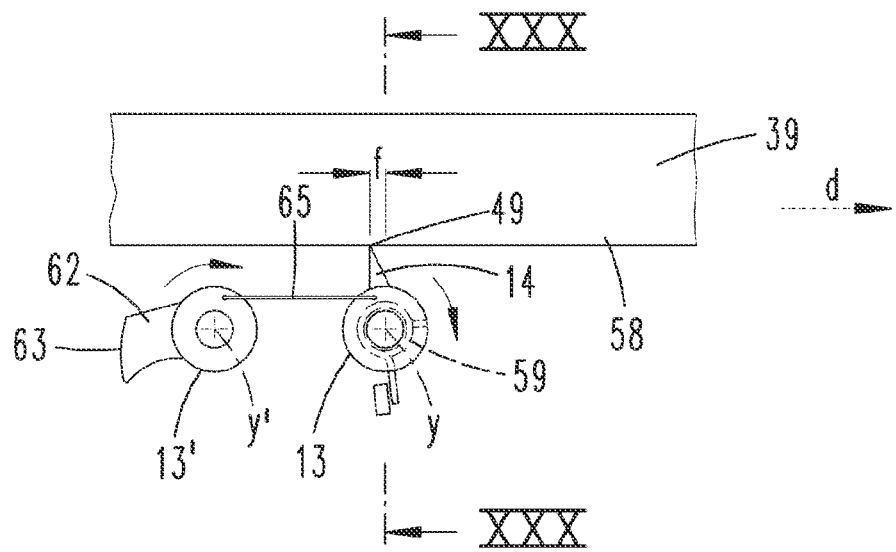
FIG. 29 shows in schematic view an alternative embodiment of the arrangement of first and second insulation-stripping cutters for use in an insulation-stripping tool or a cable cutter.
Figure 30:
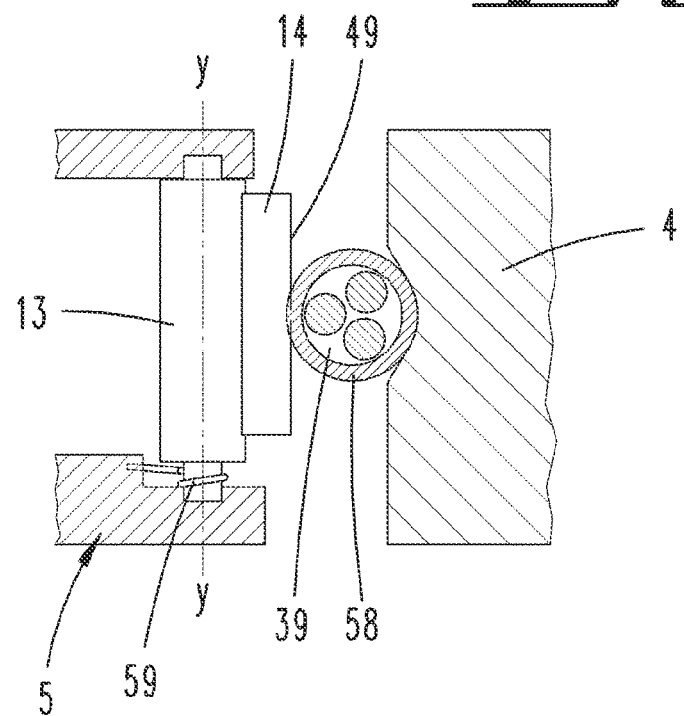
FIG. 30 shows the schematic section along the line XXX-XXX in FIG. 29.

In order to ensure a secure hold of the first insulation-stripping cutters 14 in the course of a radial insulation stripping, these are in particular arranged in relation to their cutting edges 49 cutting into the insulation 58 with reference to the direction of tension d at a distance f behind the pivot axis y (compare FIGS. 29 and 31).

Whereas the first insulation-stripping cutter 14 or its cutting edge 49 extends in a plane directed in the direction of the pivot axis y, the cutting edge 63 of the second insulation-stripping cutter 62 can run approximately in a sickle shape in a plane transverse to the cutting plane of the first insulation-stripping cutter 14 so that as a result of the tensile loading on the cable 39, a digging of the second insulation-stripping cutter 62 into the insulation 58 can be achieved.

The cutting engagement position of the second insulation-stripping cutter 62 or the release position of the first insulation-stripping cutter 14 can also be stop-limited. For example, as is also shown, the first insulation-stripping cutter 14 can enter in the handle region 9, 10 against a correspondingly aligned second stop surface 61 (compare, for example, FIG. 24).

Alternatively to the arrangement of the first and second insulation-stripping cutter on a common pivoting body, according to the diagram in FIG. 29, each insulation-stripping cutter can also be assigned a relevant pivoting body. Thus, for example, the first insulation-stripping cutter 14 can be fastened to a separate pivoting body 13 while the second insulation-stripping cutter 62 can be formed on a second pivoting body 13'. The two pivoting bodies 13 and 13' can also be motion-coupled via a rigid connection 65, so that each pivoting movement of one pivoting body 13 or 13' results in a corresponding pivoting movement of the further pivoting body 13' or 13.

In this case, accordingly two geometric pivot axes y and y' are obtained for the two insulation-stripping cutters 14 and 62, which pivot axes y and y' can run in the same direction.

Figure 27:
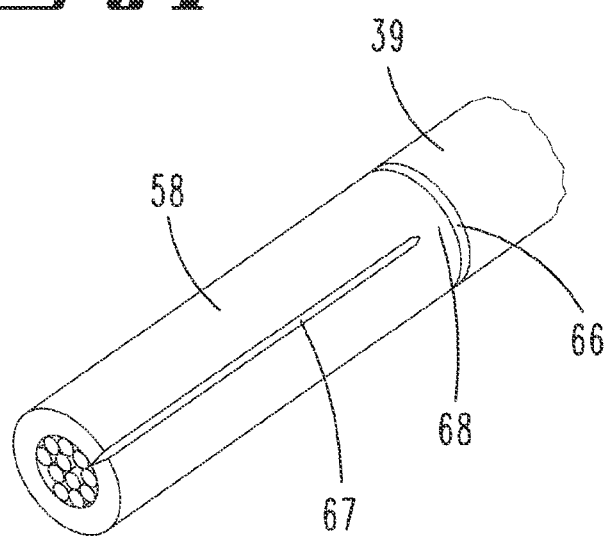
FIG. 27 shows a cable section with stripping of the insulation carried out in the circumferential direction and a stripping carried out in the longitudinal direction of the cable after carrying out an insulation-stripping process using the insulation-stripping tool.
Figure 28:
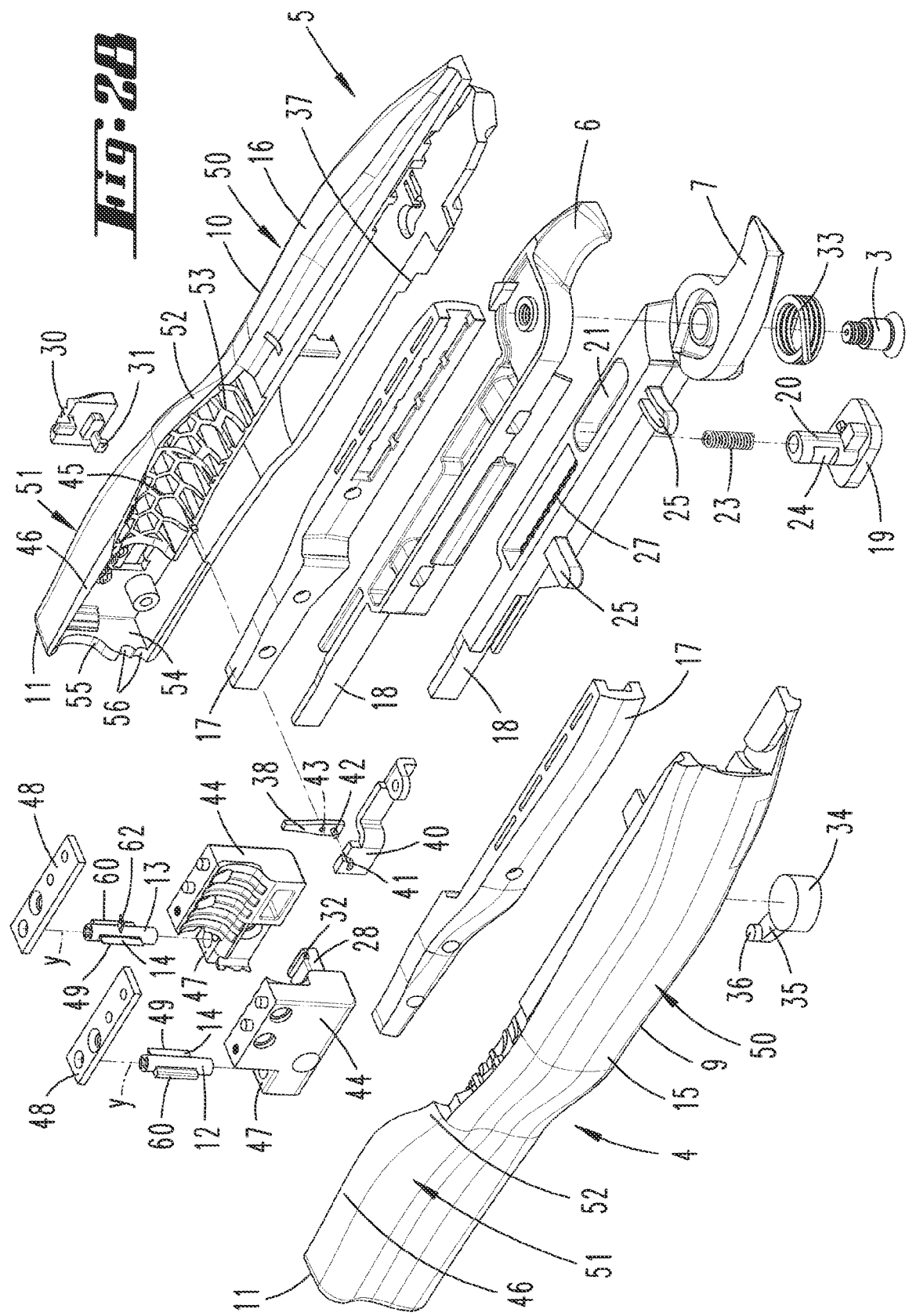
FIG. 28 shows a perspective exploded view of the cable cutter of the first embodiment.

As a result of an insulation-stripping tool 2 configured in such a manner or a tool 1 having such an insulation-stripping tool 2, a cutting pattern of the cable 39 according to FIG. 27 can be established. In the area of its insulation, the cable 39 has a circumferential cut 66 caused by the first insulation-stripping cutters 14 and a longitudinal cut 67 running in the longitudinal direction of the cable 1, caused by the second insulation-stripping cutter 62.

The longitudinal cut 67 can be carried out continuously as far as the free end of the cable 39. Facing the circumferential section 66, a connecting web 68 having a length of, for example, 0.5 as far as, for example, 2 mm can be obtained, which tears open when peeling away the insulation section.

FIGS. 35 to 49 show another embodiment of a tool 1. This also offers on one side of the scissors articulation 3 the possibility of the tool 1 for pliers-like cutting actuation, further for example, for use as cable cutter 2' and on the other side of the scissors articulation 3, for use as insulation-stripping tool 2.

In this embodiment also the functional jaw parts 6 and 7, here in the manner of cable cutters, are moved about the pivot axis x during usual use of the tool 1 with pliers legs 4 and 5 covered with handle shells 15 and 16. A leg spring 33 provided here in the region of the scissors articulation 3 brings about a spring loading in the direction of a cutting mouth open position according to the diagrams in FIGS. 35, 36 and 38 to 40.

In the region of the handle-side free ends of the pliers legs 4 and 5, in this embodiment also to form an insulation-stripping tool 2, pivoting bodies 12 and 13 with first insulation-stripping cutters 14 and a second insulation-stripping cutter 62 are provided substantially according to the previously described exemplary embodiment in an offset second longitudinal section 51.

In this case, the pliers leg 5 is formed in one piece and preferably of the same materials as the functional jaw part 7, wherein further this pliers leg 5 is also formed in one piece relative to a leg portion facing the scissors articulation 3 and a leg portion assigned to the free handle region.

The further pliers leg 4 on the other hand is preferably formed in two parts, in this case substantially forming a pliers partial leg 71 assigned to the scissors articulation 3 and formed in one piece with the relevant functional jaw part 6 and a pliers leg 72 on the side of the handle area.

The two pliers partial legs 71 and 72 can, as is also preferred, be connected to one another via a pivot bolt 73, whose geometric pivot axis v is preferably aligned parallel to the pivot axis x in the scissors articulation 3.

Further the pliers partial leg 71 preferably extends on both sides of the pivot bolt 73, wherein on the one side of the pivot bolt 73 the pliers partial leg 71 goes over into the functional jaw part 6 in the region of the scissors articulation 3 and on the other side of the pivot bolt 73 this forms a free side arm with an end-side and open-edged first blocking recess 74.

The first blocking recess 75 formed in a basic outline, for example, according to FIG. 38 in a step shape serves to cooperate with a first blocking projection 75, which is articulated pivotably to the pliers partial leg 72 on the side of the handle region. The relevant geometric pivot axis w extends preferably parallel to the alignment of the pivot axis v or to the pivot axis x of the scissors articulation 3.

The first blocking projection 75 can be formed in the manner of a pivotable bolt, which is pivotable from a latching position to the first blocking recess 74 into a release position and back deliberately by the user. For this purpose, a rotating handle 76 can be arranged at one free end of an axial body, which is connected nonrotatably to the first blocking projection 75 and which centrally receives the geometric axis of rotation w and passes through the pliers partial leg 72, which handle is exposed and can be gripper on the wall outer side of the handle shell 15 completely overlaying the pliers leg 4.

Furthermore, the first blocking projection 75 is spring-loaded in the direction of the first blocking recess of the pliers partial leg 71 on the scissors articulation side and thus in the direction of the latching and blocking position. For this purpose, according to the depicted embodiment a spring 77 in the manner of a leaf spring can be provided, which is supported on a leg-side extension 78 (compare, for example, FIG. 36).

In the blocking position shown in FIGS. 35, 36 and 38 to 44, in which the first blocking projection 75 engages in the blocking recess 74 of the pliers partial leg 71 on the side of the handle region, a force transfer connection is obtained between the pliers partial legs 71 and 72 in the direction of the cutting mouth closure position according to the diagrams in FIGS. 42 to 44. A usual displacement of the pliers legs 4 and 5 toward one another accordingly brings about a pivoting displacement of the functional jaw parts 6 and 7 in the direction of the closure position, this against the force of the spring 33 provided in the scissors articulation 3.

In the stop-limited cutting mouth closure position, for example, according to FIG. 4, the free ends of the handle regions 9 and 10 of the pliers legs 4 and 5 facing away from the cutting mouth 8 are still distanced so far from one another that no undesired clamping or cutting action can occur in this region. The selected blocking position between first blocking projection 75 and first blocking recess 74 defines the use of the tool 1 in this case merely as cable cutter 2'.

For the specific use of the tool 1 as insulation-stripping tool 2, the first blocking projection 75 is rotatably displaced via the rotating handle 76 against the restoring force of the spring 77 from the blocking position with the first blocking recess 74, whereafter, optionally initially while retaining the blocking release position of the blocking projection 75, the pliers partial leg 72 on the side of the handle region, which has been released from blocking is pivotable freely about the pivot axis v of the pivot bolt 73.

The pliers partial leg 72 on the side of the handle region is thus pivotable so far in the direction of the opposite pliers leg 5 that the receiving cavity 45 provided for receiving the cable 39 to be stripped of insulation is obtained according to the previously described embodiment. The first insulation-stripping cutters 14 which are preferably also pivotable here are brought into a position in which these can dip into the insulation 58 of the cable 39 lying in the receiving cavity 45 in a cutting manner.

Otherwise, the basic function and operating mode of the first and second insulation-stripping cutters 14 and 62, further in particular also with regard to their pivoting bodies 12 and 13, is substantially the same as the operating mode depicted with regard to the previously described embodiments.

The conversion of the tool 1, for example, from a cable cutter 2' into an insulation-stripping tool 2, can be performed, for example, in a closed cutting mouth position, further for example, from, the stop-limited cutting mouth closed position according to FIG. 44.

In an advantageous manner, in this second pivoting position of the pliers partial leg 72 on the side of the handle region relative to the pliers partial leg 71 on the scissors articulation side, a blocking of the cutting mouth 38 is achieved so that the functional jaw parts 6 and 7 cannot pivot into an open position, in particular in a configuration of the same for cutting actuation.

This is substantially achieved by a second blocking projection 79 of the pliers partial leg 72 on the side of the handle region, which can dip into a second blocking recess 80 of the opposite pliers leg 5 in this second pivot position (compare FIGS. 46, 47 and 49).

This second blocking position in the configuration of the tool 1 as an insulation-stripping tool 2 is further preferably spring-loaded, wherein in an advantageous manner the spring 77 acting on the blocking projection 74 abutting in this alignment against a facing flank 81 of the pliers leg 71 on the scissors articulation side is used. The pliers partial leg 72 on the side of the handle region, articulated to the pliers partial leg 72 on the scissors articulation side is loaded via this spring support in the direction of a closing portion of the receiving cavity 45, wherein the resulting rotational loading at the same time brings about a loading of the second blocking projection 79 into the blocking position 79.

The engagement of the second blocking projection 79 into the second blocking recess 80 allows a relative pivoting movement of the pliers partial leg 72 on the side of the handle region about the pivot axis v relative to the other pliers leg 5 (compare, for example, FIGS. 46 and 49) without the blocking between second blocking projection 79 and second blocking recess 80 being cancelled (compare FIG. 47). Accordingly, over the depicted and described pivoting path of the pliers partial leg 72 in the insulation-stripping configuration, even the cutting mouth 8 remains in a closed position or does not reach any open position so that when the tool 1 is used as an insulation-stripping tool 2, there is no risk of clamping or cutting on the side of the opposite end, which can be used for example as a cable cutter 2' and the functional jaw parts 6 and 7 provided here.

FIGS. 50 to 53 show an embodiment of an insulation-stripping tool 2 in pliers form. In this embodiment, each pliers leg 4, 5 substantially starting from the scissors articulation 3 forms on one side handle regions 9, 10 and on the other side of the scissors articulation 3 a working region. According to the previously described exemplary embodiment, on the one hand a pivoting body 12 with a first insulation-stripping cutter 14 and on the other hand a pivoting body 13 with a first insulation-stripping cutter 14 and a second insulation-stripping cutter 62 can be arranged in the working region. According to the previously described embodiment, these two pivoting bodies 12, 13 can be held pivotably about pivot axes y, which pivot axes y can run in the same direction to the pivot axes x of the scissors articulation 3.

The largest dimension of the opening cross-section in the insulation-stripping region is adjustable by means of adjusting means 69.

According to the diagram in FIG. 54, the hand tool can also comprise two half-body partial shells 70, which can be arranged pivotably about a common pivot axis z and can be connected to one another. The two half-body partial shells 70 are pivotable with respect to one another, whereafter a receiving cavity 65 can be obtained between the half-body partial shells 70 in the region of the mutually facing inner sides, which cavity can be configured to be open on both sides.

First insulation-stripping cutters 14 can be provided in the region of one end of the receiving cavity 45, which, according to the previously described exemplary embodiments, can be arranged on pivoting bodies 12, 13, wherein further according to the diagram in FIG. 55 a pivoting body 13 can comprise a second insulation-stripping cutter 62 arranged offset to the first insulation-stripping cutter 14.

The preceding explanations serve to explain the inventions covered overall by the application, which independently further develop the prior art at least by the following feature combinations in each case, wherein two, several or all these feature combinations can also be combined, namely:

An insulation-stripping tool, characterized in that the first insulation-stripping cutter 14 is mounted pivotably for movement between a cutting engagement position and a release position.

A cutting part, characterized in that a first insulation-stripping cutter 14 and a second insulation-stripping cutter 62 are formed on a pivoting body 12, 13, 13' pivotable about a pivot axis y, wherein the first insulation-stripping cutter 14 is configured for a cut in the direction of the pivot axis y and the second insulation-stripping cutter 62 is configured for a cut transversely to the pivot axis y.

An insulation-stripping tool or a cutting part, characterized in that a pivot axis y of the first insulation-stripping cutter 14 runs transversely to the longitudinal direction 1 of the cable.

An insulation-stripping tool or a cutting part, characterized in that the pivot axis y of the first insulation-stripping cutter 14 does not intersect the cable 39.

An insulation-stripping tool or a cutting part, characterized in that the first insulation-stripping cutter is movable itself between the cutting engagement position and the release position by action on the insulation-stripping cutter 14.

The insulation-stripping tool or a cutting part, characterized in that the first insulation-stripping cutter 14 has an arcuate course for covering a circumferential partial area of the cable 39.

An insulation-stripping tool or a cutting part, characterized in that the first insulation-stripping cutter 14 and second insulation-stripping cutter 62 are pivotable about different pivot axes y, y'.

An insulation-stripping tool or a cutting part, characterized in that the first insulation-stripping cutter 14 and second insulation-stripping cutter 62 are pivotable about the same pivot axis y.

An insulation-stripping tool or a cutting part, characterized in that the first insulation-stripping cutter 14 and second insulation-stripping cutter 62 are formed on the same pivoting body 13.

An insulation-stripping tool or a cutting part, characterized in that the first insulation-stripping cutter 14 and second insulation-stripping cutter 62 are configured to be offset in the circumferential direction.

An insulation-stripping tool or a cutting part, characterized in that the hand tool is configured to be pliers-like, wherein a first insulation-stripping cutter 14 is formed on working areas of both pliers legs 4, 5.

An insulation-stripping tool or a cutting part, characterized in that the hand tool comprises two hollow-body partial shells 69, which are arranged pivotably about a common pivot axis z, and that a first insulation-stripping cutter 14 is formed on the hollow-body partial shell 69.

An insulation-stripping tool or a cutting part, characterized in that the hollow-body partial shells 69 form a receiving cavity 45 for the cable 39 and that the first insulation-stripping cutter 14 and the second insulation-stripping cutter 62 are arranged so that they are assigned to the same receiving cavity 45.

A method, characterized in that the first insulation-stripping cutter (14) is brought into engagement with the insulation 58 of the cable 39 and is brought from the cutting engagement position into its release position by pulling on the cable 39.

A method, characterized in that with the pivoting of the first insulation-stripping cutter 14 into the release position the second insulation-stripping cutter 62 is at the same time brought into its engagement position.

All the disclosed features are (for themselves but also in combination with one another) essential to the invention. The disclosure content of the relevant/appended priority documents (copy of the preliminary application) is herewith included in the disclosure of the application in its entire content, also for the purpose of incorporating features of these documents in claims of the present application. The dependent claims characterize with their features, even without the features of a referenced claim, independent inventive further developments of the prior art, in particular in order to make divisional applications on the basis of these claims. The invention specified in each claim can additionally comprise one or more of the features specified in the preceding description, in particular provided with reference numbers and/or in the reference list. The invention also relates to embodiments in which individual ones of the features mentioned in the preceding description are not implemented, in particular insofar as they are clearly dispensable for the respective usage purpose or can be replaced by other means having technically the same action.

REFERENCE LIST

1 Tool
2 Insulation-stripping tool
2' Cable cutter
3 Scissors articulation
4 Pliers leg
5 Pliers leg
6 Functional leg
7 Functional leg 8 Cutting mouth
9 Handle region
10 Handle region
11 Free end
12 Pivoting body
13 Pivoting body
13' Pivoting body
14 First insulation-stripping cutter
15 Handle shell
16 Handle shell
17 First leg partial region
18 Second leg partial region
19 Button
20 Latching pin
21 Longitudinal slot
22 Latching opening
23 Spring
24 Portion
25 Projection
26 Recess
27 Spring
28 Projection
29 Recess
30 Slider
31 Locking projection
32 Locking groove
33 Spring
34 Fixing part
35 Side arm
36 Locking projection
37 Locking shoulder
38 Locking projection
39 Cable
40 Control side arm
41 Control cam
42 Control cam
43 Axis
44 Insert
45 Receiving cavity
46 Partial region
47 Notching
48 Tab
49 Cutting edge
50 First longitudinal section
51 Second longitudinal section
52 Curvature region
53 Opening
54 Front wall
55 Opening
56 Opening
57 Insulation-stripping blade
58 Insulation
59 Restoring spring
60 Stop shoulder
61 Stop surface
62 Second insulation-stripping cutter
63 Cutting edge
64 Stop surface
65 Rigid connection
66 Circumferential cut
67 Longitudinal cut
68 Connecting web
69 Adjusting means
70 Half-body partial shell
71 Pliers partial leg
72 Pliers partial leg
73 Pivot bolt
74 First blocking recess
75 First blocking projection
76 Rotating handle
77 Spring
78 Extension
79 Second blocking projection
80 Second blocking recess
81 Flank
a Length
b Length
c Direction of rotation
d Direction of tension
f Distance
Cable longitudinal direction
v Pivot axis
w Pivot axis
x Pivot axis
y Pivot axis
y' Pivot axis
z Pivot axis
E Dividing plane
S Gap

The invention claimed is:

1. An insulation-stripping tool designed as a hand tool for stripping insulation from a cable, comprising:
 a first insulation-stripping cutter configured for stripping the insulation transversely to a longitudinal direction of the cable, and
 a second insulation-stripping cutter configured for stripping the insulation in the longitudinal direction of the cable,
 wherein the first insulation-stripping cutter is mounted to a pivoting body for pivoting movement about a pivot axis between a first cutting engagement position and a first release position,
 wherein the insulation-stripping tool comprises a receiving cavity, the receiving cavity having a longitudinal direction and being configured for receiving the cable such that the longitudinal direction of the cable extends along the longitudinal direction of the receiving cavity,
 wherein the second insulation-stripping cutter is formed on the pivoting body and is pivotable about the pivot axis,
 wherein the second insulation-stripping cutter is offset circumferentially to the first insulation-stripping cutter of the pivoting body in such a manner that a pivoting of the pivoting body by approximately 90 degrees brings about a change of the first insulation-stripping cutter into the first release position and a change of the second insulation-stripping cutter from a second release position into a second cutting engagement position.

2. The insulation-stripping tool according to claim 1, wherein the pivot axis runs transversely to the longitudinal direction of the receiving cavity.

3. The insulation-stripping tool according to claim 1, wherein the pivot axis does not intersect the cable when the cable is received in the receiving cavity.

4. The insulation-stripping tool according to claim 1, wherein the first insulation-stripping cutter is movable between the first cutting engagement position and the first release position by action on the first insulation-stripping cutter.

5. The insulation-stripping tool according to claim 1, wherein the first insulation-stripping cutter has an arcuate course for covering a circumferential partial area of the cable.

6. The insulation-stripping tool according to claim 1, wherein the insulation-stripping tool comprises two pliers legs that are pivotably coupled to one another and wherein the insulation-stripping tool has a working area on each of the pliers legs, and wherein the first insulation-stripping cutter is formed on one of the working areas of the two pliers legs.

7. The insulation-stripping tool according to claim 1, wherein two hollow-body partial shells are provided, which are arranged pivotably about a common pivot axis, and wherein the first insulation-stripping cutter is formed on one of the hollow-body partial shells.

8. The insulation-stripping tool according to claim 7, wherein the hollow-body partial shells form the receiving cavity for the cable and wherein the first insulation-stripping cutter and the second insulation-stripping cutter are arranged in the receiving cavity.

9. An insulation-stripping tool designed as a hand tool configured for stripping insulation from a cable, comprising:
   a receiving cavity configured for receiving the cable;
   a first insulation-stripping cutter configured for stripping the insulation transversely to a longitudinal direction of the cable, and
   a second insulation-stripping cutter configured for stripping the insulation in the longitudinal direction of the cable,
   wherein the first insulation-stripping cutter is pivotably mounted for movement between a first cutting engagement position and a first release position,
   wherein the first insulation-stripping cutter and the second insulation-stripping cutter are mounted in the receiving cavity so as to come into interaction with the cable when the cable is received in the receiving cavity, and
   wherein, with the insulation-stripping tool held stationary, a pulling force acting on the cable in the longitudinal direction sufficient to product movement of the cable through the insulation-stripping tool moves the first insulation stripping cutter from the first cutting engagement position to the first release position, and
   wherein the first and second insulation-stripping cutters are coupled such that pivoting the first insulation-stripping cutter from the first cutting engagement position to the first release position causes the second insulation cutter to pivot from a second release position to a second cutting engagement position.

10. The insulation-stripping tool according to claim 9, wherein the first insulation-stripping cutter and second insulation-stripping cutter are pivotable about different pivot axes.

11. The insulation-stripping tool according to claim 9, wherein the first insulation-stripping cutter and the second insulation-stripping cutter are pivotable about a single pivot axis.

12. The insulation-stripping tool according to claim 9, wherein the first insulation-stripping cutter and second insulation-stripping cutter are formed on one pivoting body.

13. The insulation-stripping tool according to claim 9, wherein the first insulation-stripping cutter and second insulation-stripping cutter are offset in a circumferential direction.

14. A method for stripping insulation from a cable using an insulation-stripping tool configured as a hand tool, wherein the insulation-stripping tool comprises a first insulation-stripping cutter and a second insulation-stripping cutter, the method comprising:
   bringing the first insulation-stripping cutter into engagement with the insulation of the cable in a closed position of the hand tool,
   stripping the insulation in a circumferential direction by turning the cable about a longitudinal axis of the cable,
   and pulling on the cable while maintaining the closed position of the hand tool to obtain pivoting displacement of the first insulation-stripping cutter into a release position while pivoting the second insulation-stripping cutter into a cutting engagement position.

* * * * *